(12) United States Patent
Yan et al.

(10) Patent No.: US 12,143,143 B2
(45) Date of Patent: Nov. 12, 2024

(54) BACKSCATTER COMMUNICATION METHOD, EXCITATION DEVICE, BACKSCATTER DEVICE, AND RECEIVING DEVICE

(71) Applicant: Huawei Technologies Co., Ltd., Shenzhen (CN)

(72) Inventors: Mao Yan, Chengdu (CN); Huang Huang, Shenzhen (CN); Hua Shao, Shenzhen (CN); Lei Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 17/455,482

(22) Filed: Nov. 18, 2021

(65) Prior Publication Data

US 2022/0077886 A1 Mar. 10, 2022

Related U.S. Application Data

(63) Continuation of application No. PCT/CN2020/081828, filed on Mar. 27, 2020.

(30) Foreign Application Priority Data

May 22, 2019 (CN) .......................... 201910430302.5

(51) Int. Cl.
*H04B 1/40* (2015.01)
(52) U.S. Cl.
CPC ..................................... *H04B 1/40* (2013.01)
(58) Field of Classification Search
CPC .. H04B 5/0062; H04B 5/0037; H04B 5/0031; H04B 1/04; H04B 5/0075; H04B 5/0081;
(Continued)

(56) References Cited

U.S. PATENT DOCUMENTS

| 6,100,790 A | 8/2000 | Evans et al. |
| 2005/0007236 A1 | 1/2005 | Lane et al. |

(Continued)

FOREIGN PATENT DOCUMENTS

| CN | 1639733 A | 7/2005 |
| CN | 201234253 Y | 5/2009 |

(Continued)

OTHER PUBLICATIONS

Bing, L. et al., "Analysis and measurement for passive tag modulation performance of backscatter link", College of Electrical and Information Engineering, Hunan University, Changsha China, Aug. 31, 2011, 6 pages.

(Continued)

*Primary Examiner* — Ajibola A Akinyemi
(74) *Attorney, Agent, or Firm* — Slater Matsil, LLP

(57) ABSTRACT

Embodiments of this application disclose a backscatter communication method and a related apparatus. The method includes: An excitation device determines a first sequence, generates a first signal, and sends the first signal, where the first signal carries the first sequence; after receiving the first signal, a backscatter device modulates backscatter device data onto the received first signal to obtain a second signal, and backscatters the second signal, to implement first scrambling on the backscatter device data by using the first sequence; and a receiving device determines the first sequence, receives the second signal from the backscatter device, and demodulates the received second signal based on the first sequence, to obtain the backscatter device data carried on the second signal.

21 Claims, 14 Drawing Sheets

(58) Field of Classification Search
CPC ...... H04B 1/0003; H04B 5/0056; H04B 7/22; H04B 3/52; H04B 5/00; H04B 7/15528; H04B 1/16; H04B 1/40; H04B 11/00; H04B 13/02; H04B 5/04; H04B 7/026; H04B 7/145; H04B 7/26
USPC .......................................................... 455/78
See application file for complete search history.

(56) References Cited

U.S. PATENT DOCUMENTS

| | | | |
|---|---|---|---|
| 2010/0295663 | A1 | 11/2010 | Shoarinejad et al. |
| 2013/0185213 | A1 | 7/2013 | Insanic |
| 2016/0365890 | A1 | 12/2016 | Reynolds et al. |
| 2018/0212807 | A1* | 7/2018 | Zhang ...................... H04B 5/00 |
| 2019/0274144 | A1* | 9/2019 | Zhang ...................... H04B 7/22 |
| 2020/0052734 | A1* | 2/2020 | Talla ...................... H04B 1/1081 |

FOREIGN PATENT DOCUMENTS

| | | |
|---|---|---|
| CN | 103187998 A | 7/2013 |
| CN | 105589506 A | 5/2016 |
| CN | 106549692 A | 3/2017 |
| CN | 108496094 A | 9/2018 |
| CN | 108632825 A | 10/2018 |
| CN | 108650001 A | 10/2018 |
| CN | 109073573 A | 12/2018 |
| CN | 109150468 A | 1/2019 |
| CN | 109412992 A | 3/2019 |
| EP | 1743271 A2 | 1/2007 |
| EP | 2805428 A1 | 11/2014 |
| EP | 3468056 A1 | 4/2019 |
| EP | 3624371 A1 | 3/2020 |
| WO | 2005091889 A2 | 10/2005 |
| WO | 2013109764 A1 | 7/2013 |

OTHER PUBLICATIONS

3GPP TS 36.211 V15.5.0 (Mar. 2019), 3rd Generation Partnership Project; Technical Specification Group Radio Access Network; Evolved Universal Terrestrial Radio Access (E-UTRA); Physical channels and modulation (Release 15), 239 pages.

3GPP TS 38.211 V15.5.0 (Mar. 2019), 3rd Generation Partnership Project; Technical Specification Group Radio Access Network; NR; Physical channels and modulation (Release 15), 96 pages.

Epcglobal, Specification for RFID Air Interface; EPC™ Radio-Frequency Identity Protocols, Class-1 Generation-2 UHF RFID Protocol for Communications at 860 MHz-960 MHZ, Version 1.2.0, Oct. 23, 2008, 108 pages.

* cited by examiner

CONT. FROM FIG. 3a

CONT. FROM FIG. 3a

CONT. FROM FIG. 3a

S309: Determine the first sequence based on the parameter of the first sequence

S310: Receive the second signal

S311: Demodulate the second signal based on the first sequence, to obtain the backscatter device data carried on the second signal CONT. FROM FIG. 8a CONT. FROM FIG. 8a CONT. FROM FIG. 8a

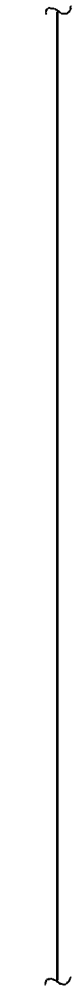

S510: Receive the second indication information, and determine a parameter of a second sequence based on the second indication information S511: Determine the second sequence based on the parameter of the second sequence S512: Receive the first signal S513: Perform second scrambling on backscatter device data by using the second sequence S514: Modulate backscatter device data obtained after the second scrambling onto the first signal to obtain a second signal S515: Backscatter the second signal TO FIG. 8c TO FIG. 8c TO FIG. 8c

FIG. 8b

CONT.
FROM
FIG. 8b

CONT.
FROM
FIG. 8b

CONT.
FROM
FIG. 8b

S516: Determine the parameter of the first sequence, and determine the first sequence based on the parameter of the first sequence S517: Determine the parameter of the second sequence, and determine the second sequence based on the parameter of the second sequence S518: Receive the second signal S519: Demodulate the second signal based on the first sequence, and descramble a demodulated second signal based on the second sequence, to obtain the backscatter device data carried on the second signal

FIG. 8c

BACKSCATTER COMMUNICATION METHOD, EXCITATION DEVICE, BACKSCATTER DEVICE, AND RECEIVING DEVICE

CROSS-REFERENCE TO RELATED APPLICATIONS

This application is a continuation of International Application No. PCT/CN2020/081828, filed on Mar. 27, 2020, which claims priority to Chinese Patent Application No. 201910430302.5, filed on May 22, 2019. The disclosures of the aforementioned applications are hereby incorporated by reference in their entireties.

TECHNICAL FIELD

This application relates to the field of communication technologies, and in particular, to a backscatter communication method, an excitation device, a backscatter device, and a receiving device.

BACKGROUND

Backscatter communication is an extremely low-power and low-cost passive communication technology that does not require a dedicated radio frequency excitation source and that is applicable to Internet of Things applications. Typical backscatter communication usually includes three nodes: an excitation device, a backscatter device, and a receiving device. The excitation device sends a wireless signal (for example, a monophonic signal, a single carrier signal, or a multi-tone signal). The backscatter device receives the wireless signal sent by the excitation device, adds backscatter device data of the backscatter device on the wireless signal to obtain a backscatter signal, and backscatters the backscatter signal to the receiving device. After receiving the backscatter signal, the receiving device demodulates the backscatter signal to obtain the backscatter device data carried on the backscatter signal.

Due to a short applicable distance of existing backscatter communication, anti-interference processing is not performed on the backscatter device data, and an anti-interference capability of the backscatter device data is poor.

SUMMARY

Embodiments of this application provide a backscatter communication method, an excitation device, a backscatter device, and a receiving device, to improve an anti-interference capability of backscatter device data, reduce persistent interference in a backscatter communication process, and improve an anti-interference capability and network performance of a backscatter communication network.

According to a first aspect, an embodiment of this application provides a backscatter communication method. The method is applicable to an excitation device in backscatter communication, and the method includes the following. The excitation device determines a first sequence, generates a first signal, and sends the first signal. The first sequence may be a pseudo-random sequence or a random sequence, and the first signal may be a wireless signal. The first signal carries the first sequence, and the first sequence may be used to perform first scrambling on backscatter device data in a backscatter device, to improve an anti-interference capability of the backscatter device data.

With reference to the first aspect, in a possible implementation, the method further includes the following. The excitation device determines a parameter of the first sequence. When the excitation device is a base station, the excitation device may obtain the parameter of the first sequence stored in the excitation device; when the excitation device is user equipment, the excitation device may receive the parameter of the first sequence from the receiving device. When determining the first sequence, the excitation device may determine the first sequence based on the parameter of the first sequence. Because the first sequence is determined based on the parameter of the first sequence, when the parameter of the first sequence changes, the first sequence also changes accordingly, so that diversity of the first sequence can be increased.

With reference to the first aspect, in a possible implementation, the method further includes: When the excitation device is a base station, the excitation device sends first indication information to a receiving device, so that the receiving device determines the first sequence based on the parameter of the first sequence indicated by using the first indication information.

With reference to the first aspect, in a possible implementation, the parameter of the first sequence includes at least one of the following information: a sequence type of the first sequence, an initial value of the first sequence, and a sequence shift value of the first sequence. Because there may be a plurality of parameters of the first sequence, a parameter diversity of the first sequence can be increased.

With reference to the first aspect, in a possible implementation, the parameter of the first sequence is determined based on at least one of the following information: a physical layer identifier of backscatter communication, a physical layer identifier of the excitation device, a physical layer identifier of the receiving device, time domain information of the first signal, and a frequency of the first signal. Because the parameter of the first sequence may be determined based on a plurality of pieces of information, a flexibility of a value of the parameter of the first sequence can be increased.

With reference to the first aspect, in a possible implementation, the method further includes: The excitation device determines a parameter of the first signal. When the excitation device is a base station, the excitation device may obtain the parameter of the first signal stored in the excitation device; when the excitation device is user equipment, the excitation device may receive the parameter of the first signal from the receiving device. When generating the first signal, the excitation device may generate the first signal based on the parameter of the first signal.

With reference to the first aspect, in a possible implementation, the parameter of the first signal includes at least one of the following information: a subcarrier location of the first signal, a subcarrier spacing of the first signal, a time length of the first signal, a frequency hopping pattern of the first signal, and transmit power of the first signal. Because the parameter of the first signal may include a plurality of pieces of information, the first signal generated by using the parameter of the first signal may be more flexible and diversified.

With reference to the first aspect, in a possible implementation, the method further includes: When the excitation device is a base station, the excitation device may send second indication information to a backscatter device and the receiving device, so that the backscatter device determines second sequence based on a parameter of the second sequence indicated by using the second indication information, and performs second scrambling on the backscatter device data based on the second sequence, to further improve the anti-interference capability of the backscatter device data.

With reference to the first aspect, in a possible implementation, the method further includes: When the excitation device is a base station, the excitation device may receive second indication information from the receiving device, and send the second indication information to a backscatter device. The second indication information is used to indicate a parameter of a second sequence, and the second sequence is used to perform second scrambling on the backscatter device data.

With reference to the first aspect, in a possible implementation, the parameter of the second sequence includes at least one of the following information: a sequence type of the second sequence, an initial value of the second sequence, and a sequence shift value of the second sequence. Because there may be a plurality of parameters of the second sequence, a parameter diversity of the second sequence can be increased.

According to a second aspect, an embodiment of this application provides a backscatter communication method. The method is applicable to a backscatter device in backscatter communication, and the method includes the following. The backscatter device receives a first signal from an excitation device, where the first signal carries a first sequence, and the first sequence is used to perform first scrambling on backscatter device data. The backscatter device modulates the backscatter device data onto the first signal to obtain a second signal, and backscatters the second signal to a receiving device, to implement first scrambling on the backscatter device data by using the first sequence, where the second signal carries backscatter device data obtained after the first scrambling. In this application, the first signal is randomized by adding a sequence on the first signal, to equivalently implement the first scrambling on the backscatter device data and/or the second signal, so that an anti-interference capability of the backscatter device data is improved, persistent interference in a backscatter communication process is reduced, and an anti-interference capability and network performance of a backscatter communication network is improved.

With reference to the second aspect, in a possible implementation, the method further includes: The backscatter device may determine a second sequence, and may perform second scrambling on the backscatter device data by using the second sequence. The backscatter device may modulate backscatter device data obtained after the second scrambling onto the first signal to obtain a second signal. In this application, the backscatter device data is randomized by directly performing the second scrambling on the backscatter device data by using the second sequence, so that the anti-interference capability of the backscatter device data can be improved, and demodulation performance of the receiving device can be improved.

With reference to the second aspect, in a possible implementation, the method further includes: The backscatter device may receive second indication information from the excitation device and/or the receiving device, where the second indication information is used to indicate a parameter of the second sequence.

With reference to the second aspect, in a possible implementation, the parameter of the second sequence includes at least one of the following information: a sequence type of the second sequence, an initial value of the second sequence, and a sequence shift value of the second sequence.

According to a third aspect, an embodiment of this application provides a backscatter communication method. The method is applicable to a receiving device in backscatter communication, and the method includes: The receiving device determines a first sequence, where the first sequence is used to perform first scrambling on backscatter device data. The receiving device receives a second signal from a backscatter device, and demodulates the second signal based on the first sequence, to implement first scrambling on backscatter device data obtained after the first scrambling, and further to obtain the backscatter device data. The second signal carries the backscatter device data obtained after the first scrambling, and the first sequence is sent by an excitation device to the backscatter device by using a first signal. Because the backscatter device data in this application is scrambled by using the first sequence to obtain the second signal, anti-interference capabilities of the backscatter device data and/or the second signal are high. A probability increases that after receiving the second signal, the receiving device correctly obtains the backscatter device data through demodulation. Therefore, accuracy of the received backscatter device data can be improved.

With reference to the third aspect, in a possible implementation, the method further includes: The receiving device determines a parameter of the first sequence, and the receiving device may determine the first sequence based on the parameter of the first sequence. Because the excitation device also determines the first sequence based on the parameter of the first sequence, and rules for determining the first sequence by the excitation device and the receiving device are also the same, the first sequences determined by the receiving device and the excitation device are also the same. Therefore, the receiving device demodulates the second signal by using the first sequence, so that demodulation efficiency and accuracy can be improved.

With reference to the third aspect, in a possible implementation, the method further includes: When the excitation device is user equipment, the receiving device may send first indication information to the excitation device, where the first indication information is used to indicate the parameter of the first sequence.

With reference to the third aspect, in a possible implementation, the method further includes: When the excitation device is a base station, the receiving device may receive second indication information from the excitation device, where the second indication information is used to indicate a parameter of a second sequence. The receiving device may determine the second sequence based on the parameter of the second sequence, and may descramble (which refers to second descrambling herein) a demodulated second signal based on the second sequence, to obtain the backscatter device data. When the backscatter device performs the second scrambling on the backscatter device data, the receiving device descrambles demodulated data based on the second sequence determined based on the parameter of the second sequence, to recover the backscatter device data.

With reference to the third aspect, in a possible implementation, the method further includes: When the excitation device is user equipment, the receiving device may send second indication information to the excitation device, where the second indication information is used to indicate a parameter of a second sequence.

With reference to the third aspect, in a possible implementation, the method further includes: When the excitation device is user equipment, the receiving device may send third indication information to the excitation device, so that the excitation device generates the first signal based on a parameter that is of the first signal and that is indicated by using the third indication information.

According to a fourth aspect, an embodiment of this application provides an excitation device. The excitation device includes units and/or modules configured to perform the backscatter communication method according to any one of the first aspect and/or the possible implementations of the first aspect. Therefore, beneficial effects (or advantages) of the backscatter communication method provided in the first aspect can also be implemented.

According to a fifth aspect, an embodiment of this application provides a backscatter device. The backscatter device includes units and/or modules configured to perform the backscatter communication method according to any one of the second aspect and/or the possible implementations of the second aspect. Therefore, beneficial effects (or advantages) of the backscatter communication method provided in the second aspect can also be implemented.

According to a sixth aspect, an embodiment of this application provides a receiving device. The receiving device includes units and/or modules configured to perform the backscatter communication method according to any one of the third aspect and/or the possible implementations of the third aspect. Therefore, beneficial effects (or advantages) of the backscatter communication method provided in the third aspect can also be implemented.

According to a seventh aspect, an embodiment of this application provides an excitation device, including a processor, a transceiver, and a memory. The memory is configured to store a computer program, the computer program includes program instructions, and when the processor runs the program instructions, the backscatter communication method according to the first aspect is performed.

According to an eighth aspect, an embodiment of this application provides a backscatter device, including a processor, a transceiver, and a memory. The memory is configured to store a computer program, the computer program includes program instructions, and when the processor runs the program instructions, the backscatter communication method according to the second aspect is performed.

According to a ninth aspect, an embodiment of this application provides a receiving device, including a processor, a transceiver, and a memory. The memory is configured to store a computer program, the computer program includes program instructions, and when the processor runs the program instructions, the backscatter communication method according to the third aspect is performed.

According to a tenth aspect, an embodiment of this application provides a computer-readable storage medium. The computer-readable storage medium stores computer program instructions. When the computer program instructions are run on a computer, the computer is enabled to perform the backscatter communication method according to the first aspect.

According to an eleventh aspect, an embodiment of this application provides a computer-readable storage medium. The computer-readable storage medium stores computer program instructions. When the computer program instructions are run on a computer, the computer is enabled to perform the backscatter communication method according to the second aspect.

According to a twelfth aspect, an embodiment of this application provides a computer-readable storage medium. The computer-readable storage medium stores computer program instructions. When the computer program instructions are run on a computer, the computer is enabled to perform the backscatter communication method according to the third aspect.

According to a thirteenth aspect, an embodiment of this application provides a computer program product. The computer program product includes computer program code. When the computer program code is run on a computer, the computer is enabled to perform the backscatter communication method according to the first aspect.

According to a fourteenth aspect, an embodiment of this application provides a computer program product. The computer program product includes computer program code. When the computer program code is run on a computer, the computer is enabled to perform the backscatter communication method according to the second aspect.

According to a fifteenth aspect, an embodiment of this application provides a computer program product. The computer program product includes computer program code. When the computer program code is run on a computer, the computer is enabled to perform the backscatter communication method according to the third aspect.

According to a sixteenth aspect, an embodiment of this application provides a communication apparatus. The communication apparatus has functions of the excitation device according to any one of the possible implementations of the first aspect. The functions may be implemented by hardware, or may be implemented by hardware by executing corresponding software. The hardware or the software includes one or more units corresponding to the functions.

According to a seventeenth aspect, an embodiment of this application provides a communication apparatus. The communication apparatus has functions of the backscatter device according to any one of the possible implementations of the second aspect. The functions may be implemented by hardware, or may be implemented by hardware by executing corresponding software. The hardware or the software includes one or more units corresponding to the functions.

According to an eighteenth aspect, an embodiment of this application provides a communication apparatus. The communication apparatus has functions of the receiving device according to any one of the possible implementations of the third aspect. The functions may be implemented by hardware, or may be implemented by hardware by executing corresponding software. The hardware or the software includes one or more units corresponding to the functions.

According to a nineteenth aspect, an embodiment of this application provides a chip, including a processor. The processor is configured to read and execute a computer program stored in a memory, to perform the backscatter communication method in any one of the possible implementations of the first aspect, the second aspect, and the third aspect. Optionally, the chip further includes the memory, and the memory is connected to the processor through a circuit or a wire. Further, optionally, the chip further includes a communication interface. The processor is connected to the communication interface. The communication interface is configured to receive data and/or information that needs to be processed. The processor obtains the data and/or the information from the communication interface, processes the data and/or the information, and outputs a processing result by using the communication interface. The communication interface may be an input/output interface.

Optionally, the processor and the memory may be physically independent units, or the memory and the processor may be integrated together.

According to the embodiments of this application, on one hand, an anti-interference capability of the backscatter device data can be improved, persistent interference in a backscatter communication process can be reduced, and an anti-interference capability and network performance of a backscatter communication network can be improved. On the other hand, computing complexity on the backscatter device can be reduced, power consumption can be saved, and costs can be reduced.

BRIEF DESCRIPTION OF THE DRAWINGS

FIG. 8a to FIG. 8c are still another schematic flowchart of a backscatter communication method according to an embodiment of this application;

DETAILED DESCRIPTION OF ILLUSTRATIVE EMBODIMENTS

The following clearly describes the technical solutions in the embodiments of this application with reference to the accompanying drawings in the embodiments of this application.

Figure 1:
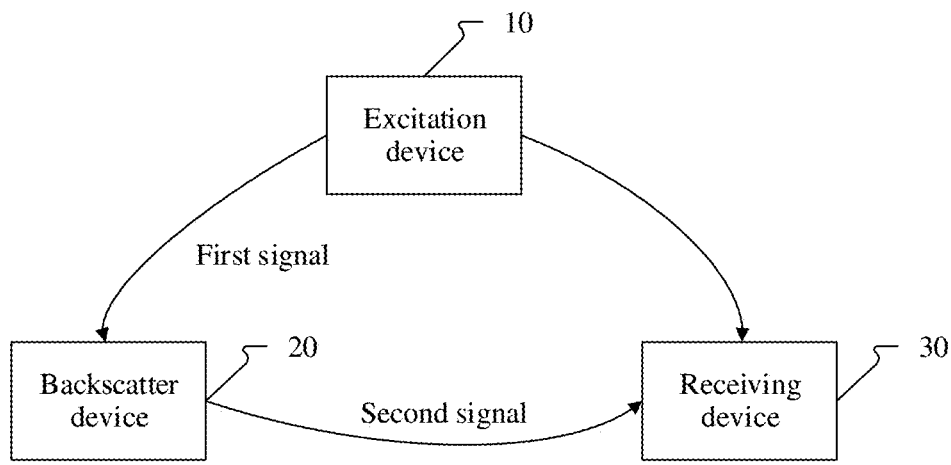
FIG. 1 is a diagram of a system architecture of a backscatter communication system according to an embodiment of this application.

FIG. 1 is a diagram of a system architecture of a backscatter communication system according to an embodiment of this application. As shown in FIG. 1, the backscatter communication system in this application may include an excitation device 10, a backscatter device 20, and a receiving device 30. The excitation device 10 may determine a sequence (namely, a first sequence, where the first sequence may be a random sequence or a pseudo-random sequence) based on a parameter of the sequence (for example, a sequence type, an initial value, and/or a sequence shift value), and may modulate the sequence onto a carrier signal to generate a first signal. The excitation device 10 sends the first signal. The backscatter device 20 may determine backscatter device data (for example, identification data and sensor data). The backscatter device 20 may receive the first signal from the excitation device 10, and may modulate the backscatter device data onto the first signal (that is, implement first scrambling on the backscatter device data by using the sequence carried on the first signal), to obtain a second signal. The backscatter device 20 backscatters the second signal to the receiving device 30. The receiving device 30 receives the second signal, and may determine the foregoing sequence (namely, the first sequence) based on the parameter of the sequence. The receiving device 30 demodulates the second signal based on the sequence, to obtain the backscatter device data carried on the second signal. In this embodiment of this application, the first signal is randomized by adding a sequence on the first signal, to equivalently implement scrambling on the second signal and/or the backscatter device data, so that an anti-interference capability of the backscatter device data is improved, persistent interference in a backscatter communication process is reduced, and an anti-interference capability and network performance of a backscatter communication network are improved. The sequence carried on the first signal may further be used to transmit identity information (for example, an ID and a C-RNTI) of the excitation device 10 to the receiving device 30, so that the receiving device can identify the excitation device, and communication security can be improved.

Figure 2:
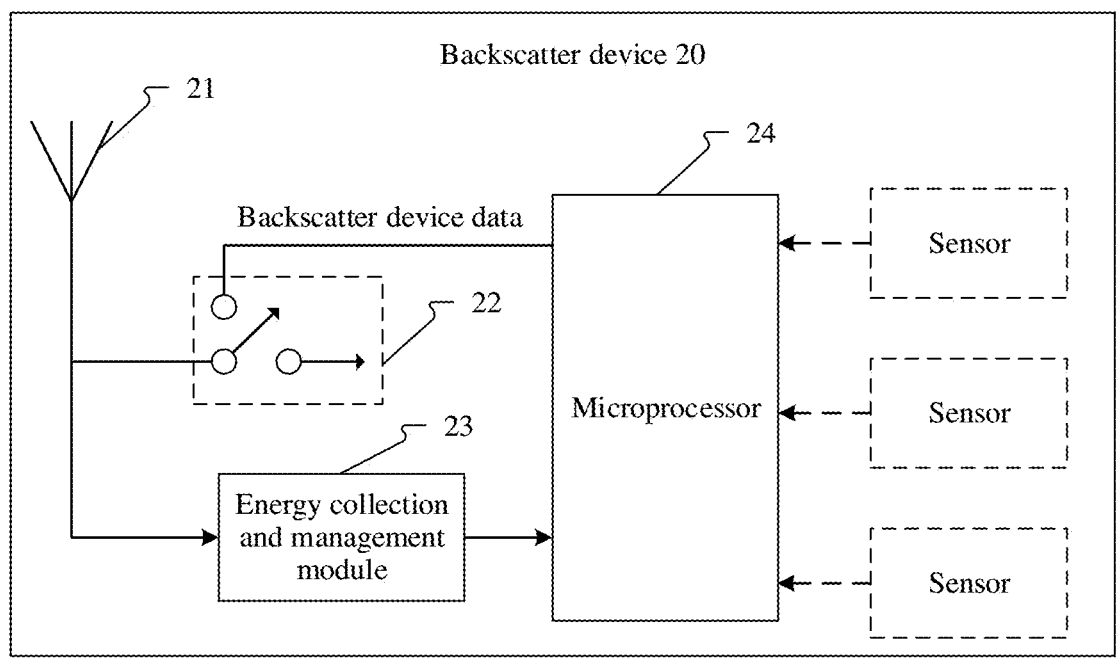
FIG. 2 is a schematic diagram of a structure of a backscatter device according to an embodiment of this application.

In some feasible implementations, the excitation device and the receiving device may be integrated into one device. For example, in a radio frequency identification (RFID) system, the excitation device and the receiving device are integrated into a reader, and the backscatter device is referred to as a tag in the RFID system. In some other feasible implementations, the backscatter device may also be referred to as a passive device, a semi-passive device, a scattered signal device (which is also referred to as an ambient signal device), or the like. FIG. 2 is a schematic diagram of a structure of a backscatter device according to an embodiment of this application. The backscatter device 20 includes an antenna 21, a backscatter module 22, an energy collection and management module 23, and a microprocessor 24. The antenna 21 is configured to send/receive a signal. For example, the antenna 21 receives a first signal from an excitation device 10, and the antenna 21 backscatters a second signal to a receiving device 30. The backscatter module 22 is configured to: modulate backscatter device data onto the first signal to generate the second signal (that is, implement first scrambling on the backscatter device data by using a first sequence to obtain the second signal), and backscatter the second signal. When receiving energy, an internal circuit of the backscatter module is connected to a charging module; when backscattering a signal, the internal circuit of the backscatter module is connected to a backscatter and modulation module. The energy collection and management module 23 is configured to convert a received energy signal to an electric signal to provide electric energy for the microprocessor 24. The microprocessor 24 is configured to process received data and the backscatter device data. For example, the microprocessor 24 performs second scrambling on the backscatter device data by using a second sequence. The backscatter device 20 may further include one or more sensors. Optionally, the backscatter module 22 in the backscatter device 20 may be implemented by using a hardware component, a chip, or the like.

In some feasible implementations, there may be a plurality of relationships between the excitation device and the receiving device in a long term evolution (LTE) or new radio (NR) network. For example, the excitation device is user equipment, and the receiving device may be a base station; the excitation device is a base station, and the receiving device may be user equipment; both the excitation device and the receiving device may be user equipment; or both the excitation device and the receiving device may be base stations. The relationship between the excitation device and the receiving device in the LTE or NR network is not limited in this application.

A backscatter communication method in this application may be applied to the Internet of Things that "connect all things", for example, an electronic toll collection (ETC) system, logistics tracking, and a smart appliance. For ease of understanding, application scenarios of the backscatter communication method are first described in this application.

Scenario 1: An ETC system includes a road side unit (RSU) and an on board unit (OBU). The RSU is also referred to as a microwave antenna read/write controller (corresponding to the excitation device and the receiving device in this application). The OBU is also referred to as an electronic tag (corresponding to the backscatter device in this application), and the OBU may store vehicle information (for example, a vehicle identification, a license plate number, a vehicle type, and driver information). The RSU sends an inquiry signal (corresponding to the first signal in this application). After a vehicle carrying the OBU enters an ETC lane, the OBU receives the inquiry signal from the RSU, and modulates, onto the inquiry signal, vehicle information (corresponding to the backscatter device data in this application) that is stored in the OBU and that is obtained after encoding and/or encryption, to obtain a backscatter signal. The OBU transmits the backscatter signal to the RSU by using an antenna. The RSU receives the backscatter signal from the OBU, and performs operations such as demodulation, decryption, and/or decoding on the backscatter signal to obtain the vehicle information carried on the backscatter signal, to identify the vehicle.

Scenario 2: Logistics tracing. An electronic tag (corresponding to the backscatter device in this application) is attached to an article, and the electronic tag may store article information (for example, information such as an article identification, an article type, an article location, or an article status) of the article. The electronic tag in this scenario may be a backscatter device configured to backscatter the article information. A base station (corresponding to the excitation device in this application) may send a wireless signal (corresponding to the first signal in this application). After receiving the wireless signal sent by the base station, the electronic tag on the article may modulate, onto the wireless signal, article information that is stored in the electronic tag and that is obtained after encryption and/or encoding, to obtain a backscatter signal, and backscatter the backscatter signal to user equipment (corresponding to the receiving device in this application). After receiving the backscatter signal, the user equipment performs demodulation, decoding, and/or decryption on the backscatter signal, to obtain the article information carried on the backscatter signal. A user can view the article information of the article in real time on the user equipment.

Scenario 3: Smart appliance. When a wireless network (Wi-Fi) gateway normally communicates with a communication device, the Wi-Fi gateway (corresponding to the excitation device in this application) sends a Wi-Fi signal, a smart appliance (corresponding to the backscatter device in this application) may receive the Wi-Fi signal (corresponding to the first signal in this application), and may add status information (such as power consumption and a device identifier) of the smart appliance on the Wi-Fi signal and backscatter the Wi-Fi signal to user equipment (corresponding to the receiving device in this application, such as a mobile phone or a laptop computer). The user equipment performs operations such as demodulation on the received Wi-Fi signal that carries the status information, to obtain the status information.

For ease of description, scrambling in the backscatter communication method provided in this application may be implemented by performing bit-by-bit exclusive OR on a sequence signal and a data signal, or by performing modulo 2 on a sum of the sequence signal and the data signal to obtain a remainder, or is implemented by multiplying a modulated sequence signal by a modulated data signal, or adding the modulated sequence signal to the modulated data signal. The sequence signal may be a sequence known by a receive end, may be a sequence determined by using a preset rule, or may be a sequence learned by using another means. The foregoing types of scrambling may be performed on a same device. Alternatively, scrambling may be implemented by superposition of wireless transmission signals of two devices in space, or scrambling may be implemented by performing an operation (for example, backscatter) by one device on a wireless signal of another device. The scrambling (scrambling) may also be referred to as data processing, data operation, and the like.

The scrambling described in this application is mainly first scrambling, and may further include second scrambling. During actual application, "first scrambling" is first data processing, and is implemented by adding, on an excitation signal (namely, a first signal sent by an excitation device), a random or quasi-random (pseudo-random) information bit sequence (or referred to as data) that can be obtained by a receiving device. "Second scrambling" is second data processing, which means that processing (namely, an exclusive OR operation) is performed on backscatter device data on a backscatter device by using a random, pseudo-random, or quasi-random information bit sequence (or referred to as data) that is indicated by the excitation device or that can be obtained by the receiving device, the backscatter device data is further modulated onto a received excitation signal, and the excitation signal is backscattered to the receiving device. The first sequence and the second sequence in this application may be different scrambling sequences, and the scrambling sequence may further have another name, for example, a signature sequence or a scrambling code.

The following describes the backscatter communication method provided in this application with reference to FIG. 3a to FIG. 8c.

Figure 3A:
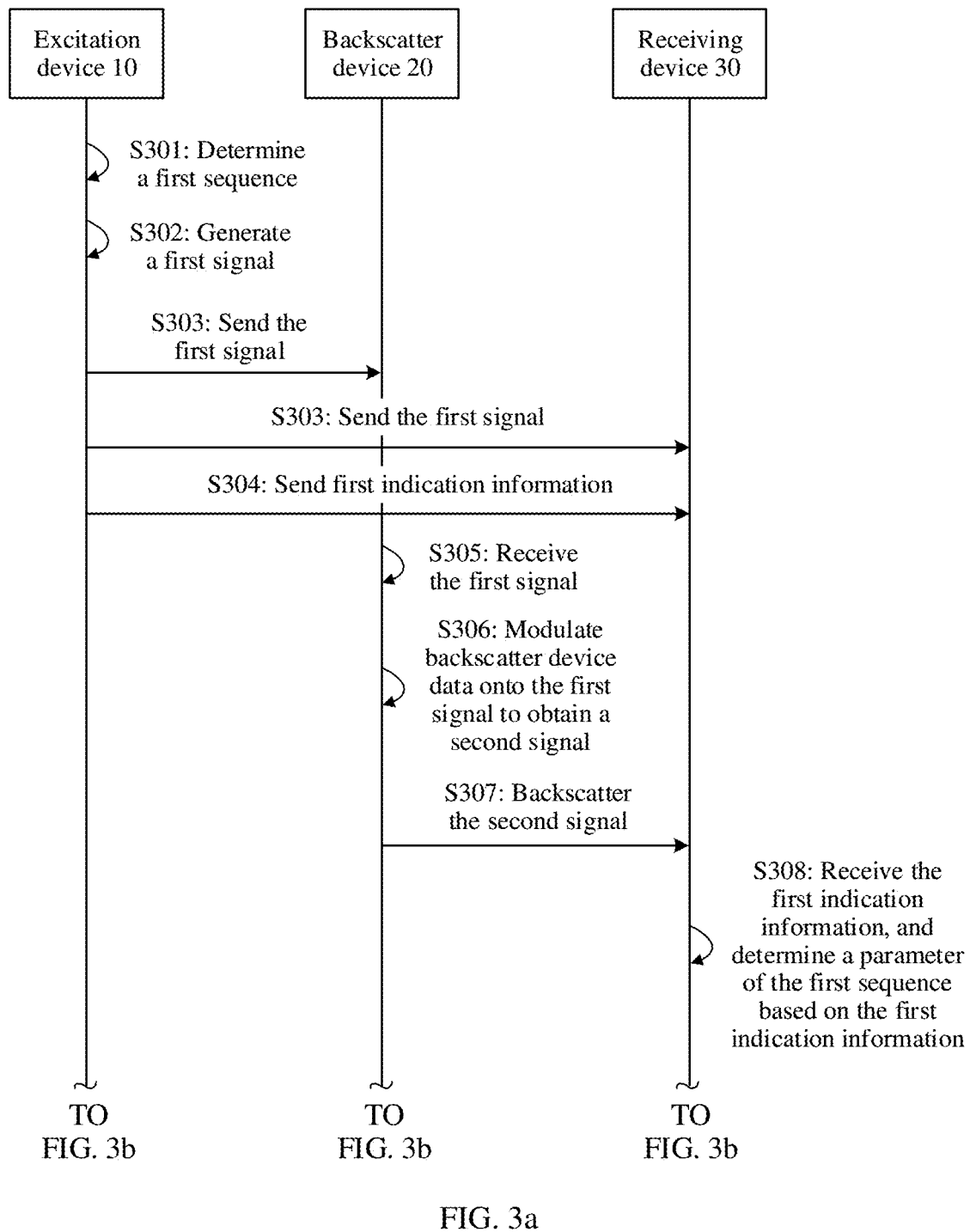
FIG. 3a and FIG. 3b are a schematic flowchart of a backscatter communication method according to an embodiment of this application.
Figure 3B:
Figure 3B:
Figure 3B:

FIG. 3a and FIG. 3b are a schematic flowchart of a backscatter communication method according to an embodiment of this application. The backscatter communication method is applicable to an excitation device 10, a backscatter device 20, and a receiving device 30. The excitation device in this embodiment of this application corresponds to a base station in an LTE or NR network. The backscatter communication method provided in this embodiment of this application includes the following steps.

S301: The excitation device 10 determines a first sequence.

In some feasible implementations, the first sequence may be pre-stored in the excitation device 10. For example, the first sequence may be a preset binary sequence 11010111. The first sequence may alternatively be a random sequence or a pseudo-random sequence. The pseudo-random sequence may include a Gold sequence, a maximum linear feedback shift register sequence (or referred to as maximum length sequence, m sequence), a Kasami sequence, a complement sequence, a Zadoff-Chu sequence, a quadratic residue sequence, a double prime sequence, a Frank sequence, a Golomb sequence, a Chirp sequence, a P4 sequence, a multiphase sequence, a Golay sequence, another low peak-to-average ratio sequence, or the like.

In some feasible implementations, the excitation device 10 may determine a parameter of the first sequence, and determine the first sequence based on the parameter of the first sequence. The first sequence may be a binary sequence. The parameter of the first sequence includes a sequence type of the first sequence, an initial value of the first sequence, and/or a sequence shift value of the first sequence. The sequence type and the sequence shift value of the first sequence both may be preset. For example, the sequence type of the first sequence is the Gold sequence, and the sequence shift value $N_{C1}$ of the first sequence is 7. The initial value of the first sequence may include a first initial value and a second initial value. The first initial value may be a fixed value, and the second initial value may be determined based on at least one of the following information: a physical layer identifier (for example, a radio network temporary identifier (RNTI), or a physical layer cell identifier (cell ID)) of backscatter communication, a physical layer identifier (ID) of the excitation device, a physical layer ID of the receiving device, a slot index of the backscatter communication, an orthogonal frequency division multiplexing (OFDM) symbol index of the backscatter communication, a subcarrier spacing of the backscatter communication, a radio frame index of the backscatter communication, and/or a subframe index of the backscatter communication. Alternatively, the first initial value is determined based on at least one of the following information: a physical layer ID of backscatter communication, a physical layer ID of the excitation device, a physical layer ID of the receiving device, a slot index of the backscatter communication, an OFDM symbol index of the backscatter communication, a subcarrier spacing of the backscatter communication, a radio frame index of the backscatter communication, and/or a subframe index of the backscatter communication; and the second initial value is a fixed value. Specific representations of the first initial value and the second initial value may be determined based on an actual application scenario. This is not limited in this application. Optionally, the information used to determine the first initial value or the second initial value may further include at least one of a carrier frequency index of the backscatter communication, a backscatter communication frequency index, and/or a bandwidth part index (bandwidth part index) of the backscatter communication.

In some feasible implementations, the first initial value may be a fixed value, and the second initial value may be determined based on the following information: a physical layer identifier (for example, a radio network temporary identifier or a physical layer cell identifier) of backscatter communication, a slot index of the backscatter communication, an OFDM symbol index of the backscatter communication, a subcarrier spacing of the backscatter communication, and a subframe index of the backscatter communication.

In some feasible implementations, the first initial value may be determined based on the following information: a physical layer identifier (for example, a radio network temporary identifier or a physical layer cell identifier) of backscatter communication, a slot index of the backscatter communication, an OFDM symbol index of the backscatter communication, a subcarrier spacing of the backscatter communication, and a subframe index of the backscatter communication; and the second initial value may be a fixed value.

A manner of determining the first sequence is briefly described by using an example in which the sequence type of the first sequence is the Gold sequence. It is assumed that the sequence type of the first sequence is a Gold sequence with an order of 31, and the sequence shift value $N_{C1}$ is 7. The Gold sequence is obtained by adding a preferred pair of two m sequences that have a same code length and a same code clock rate and performing modulo 2, where "order of 31" indicates that an order of a generator polynomial of an m sequence is 31, and a corresponding sequence length is $2^{31}-1$. A formula for generating the Gold sequence $c_1(n)$ with the order of 31 may be represented as:

$$c_1(n)=(x_1(n+N_{C1})+x_2(n+N_{C1}))\bmod 2=(x_1(n+7)+x_2(n+7))\bmod 2, \quad (3\text{-}1)$$

where a value range of n is integers ranging from 0 to $2^{31}-1$ (including 0 and $2^{31}-1$). $x_1(n)$ and $x_2(n)$ represent two m sequences with orders of 31. The m sequence $x_1(n)$ with the order of 31 may be determined by using formula (3-2), and $x_2(n)$ may be determined by using formula (3-3):

$$x_1(n+31)=(x_1(n+3)+x_1(n))\bmod 2, \quad (3\text{-}2)$$

$$x_2(n+31)=(x_2(n+3)+x_2(n+2)+x_2(n+1)+x_2(n))\bmod 2, \quad (3\text{-}3)$$

In a process of generating the pseudo-random sequence, an initial value of the pseudo-random sequence needs to be specified. The Gold sequence is used as an example. Because the Gold sequence is obtained by adding two m sequences and performing modulo 2, the Gold sequence has two initial values. To be specific, each m sequence has an initial value.

In some feasible implementations, it is assumed that an initial value of $x_1(n)$ is a first initial value $x_{init1}$, and an initial value of $x_2(n)$ is a second initial value $c_{init2}$. The first initial value $c_{init1}$ may be a preset fixed value. If the first initial value $c_{init1}$ is a fixed value rather than a binary sequence, values of $x_1(0), x_1(1), x_1(2), \ldots, x_1(30)$ may be separately obtained by using $c_{init1}=\sum_{k=0}^{30}x_1(k)2^k$. For example, if $c_{init1}$ is a decimal number 12, $x_1(2), x_1(3)$ are 1, and $x_1(0), x_1(1)$ and $x_1(4), x_1(5), x_1(6), \ldots, x_1(30)$ are all 0. The second initial value $c_{init2}$ may be a preset fixed value, or may be another value. In an implementation, the first initial value $c_{init1}$ is a fixed value, and the second initial value $c_{init2}$ may be represented as:

$$c_{init2}=(2^{17}(N_{symb}^{slot}N_{s,f}^{u}+l+1)(2N_{ID}^{nscid}+1)+2N_{ID}^{nscid}+n_{scid})\bmod 2^{31}, \quad (3\text{-}4)$$

$$\text{or } c_{init2}=(2^{17}(N_{symb}^{slot}N_{s,f}^{u}+l+1)(2N_{ID}+1)+2N_{ID})\bmod 2^{31}, \quad (3\text{-}5)$$

where $N_{symb}^{slot}$ represents a quantity of OFDM symbols in one slot, $N_{s,f}^{u}$ represents a quantity of slots in one radio frame, u represents a subcarrier spacing index, l represents an OFDM symbol index, $N_{ID}^{nscid}$ or $N_{ID}$ represents a scrambling ID (which may be specifically any physical layer ID in the physical layer ID of the backscatter communication, the physical layer ID of the excitation device, and the physical layer ID of the receiving device), and $n_{SCID}$ is 0 or 1 (or another value) depending on a current application scenario of the sequence (for example, when $n_{SCID}$ is 0, it indicates that a signal carrying the sequence $c_1(n)$ is sent in a broadcast manner, and when $n_{SCID}$ is 1, it indicates that the signal carrying the sequence $c_1(n)$ is sent in a unicast manner; or when $n_{SCID}$ is 0, it indicates that the sequence $c_1(n)$ is used to scramble data of a first type, and when $n_{SCID}$ is 1, it indicates that the sequence $c_1(n)$ is used to scramble data of a second type, where the current application scenario of the sequence determining whether $n_{SCID}$ is 0 or 1 is not limited in this embodiment of this application). Optionally, after the second initial value $c_{init2}$ is calculated according to formula (3-4) or formula (3-5), if the second initial value is not a binary sequence, values of $x_2(0)$, $x_2(1)$, $x_2(2)$, ..., $x_2(30)$ may be separately obtained by using $$c_{init2} = \sum_{k=0}^{30} x_2(k)2^k.$$

In some other feasible implementations, the second initial value $c_{init2}$ may be a preset fixed value, and the first initial value $c_{init1}$ may be represented as:

$$c_{init1} = \qquad\qquad (3\text{-}6)$$
$$\left(2^{17}\left(N_{symb}^{slot}N_{s,f}^u + l + 1\right)\left(2N_{ID}^{nSCID} + 1\right) + 2N_{ID}^{nSCID} + n_{SCID}\right)\mod 2^{31},$$

or $$c_{init1} = \left(2^{17}\left(N_{symb}^{slot}N_{s,f}^u + l + 1\right)(2N_{ID} + 1) + 2N_{ID}\right)\mod 2^{31}, \quad (3\text{-}7)$$

In some feasible implementations, the excitation device 10 may use the entire generated Gold sequence as the first sequence, or may select a segment of Gold sequence from the entire generated Gold sequence as the first sequence, for example, use the first 16 bits of the generated Gold sequence as the first sequence. This is not limited in this embodiment of this application.

S302: The excitation device 10 generates a first signal.

S303: The excitation device 10 sends the first signal.

In some feasible implementations, the first signal carries the first sequence. The excitation device 10 may determine a parameter of the first signal, where the parameter of the first signal may include a subcarrier location of the first signal, a subcarrier spacing of the first signal, a time length of the first signal, a frequency hopping pattern of the first signal, and/or transmit power of the first signal. The excitation device 10 may modulate, in a modulation manner such as binary phase shift keying (BPSK) or quadrature amplitude modulation (QAM), the first sequence onto a carrier signal (for example, a continuous sine wave) based on the parameter of the first signal, to generate the first signal. The excitation device 10 may send the first signal by using an antenna (for example, a massive multiple-input multiple-output (MIMO) antenna system). The first signal may be a wireless signal.

Figure 4A:
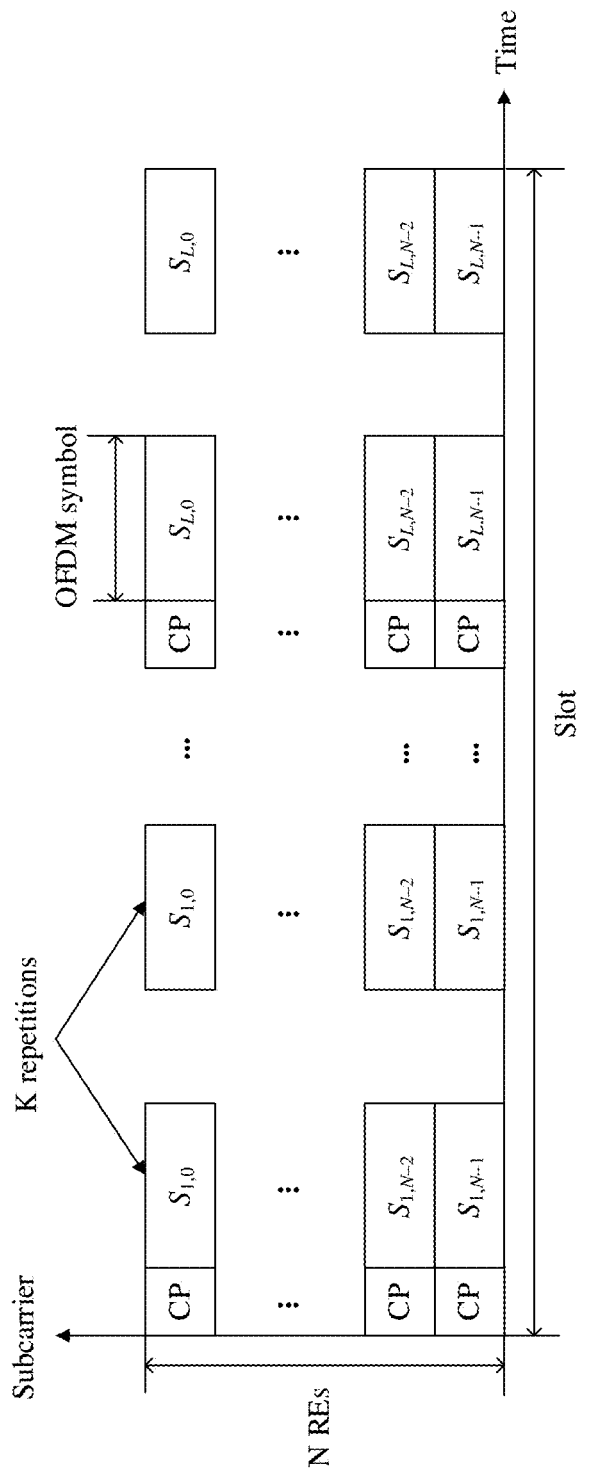
FIG. 4a and FIG. 4b are a schematic diagram of a time-frequency structure of a first signal according to an embodiment of this application.
Figure 4B:
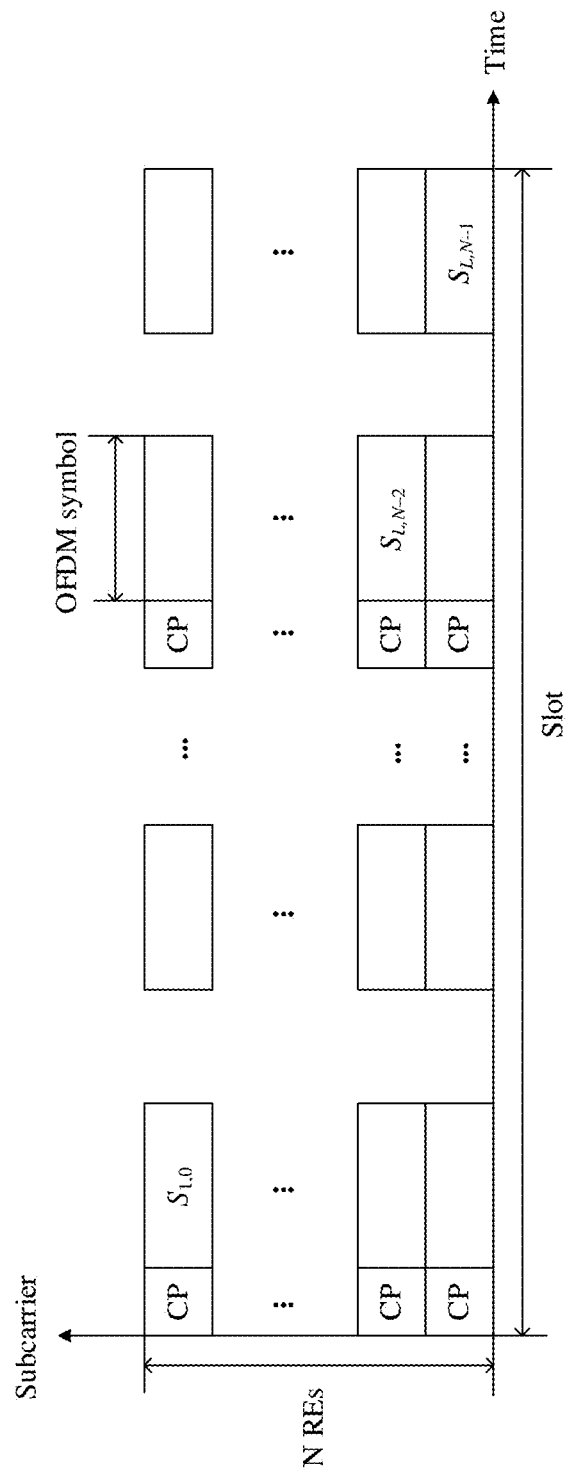

In some feasible implementations, for ease of understanding, the following briefly describes a time-frequency structure of the first signal. FIG. 4a and FIG. 4b are a schematic diagram of a time-frequency structure of a first signal according to an embodiment of this application. It is assumed that the time-frequency structure of the first signal includes N resource elements (REs). RE is the smallest resource unit in physical resources, and the RE occupies one OFDM symbol (1/14 ms) in time domain and one subcarrier in frequency domain. CP in FIG. 4a and FIG. 4b represents a cyclic prefix, and $s_{ij}$ represents the first sequence or a symbol (to be specific, a modulated symbol) corresponding to the first sequence. N, K, and L may be predefined values, or may be constants indicated by the receiving device. A subcarrier on which the first signal is located carries the first sequence. As shown in FIG. 4a, in different OFDM symbols or different slots, first signals may be located at a same subcarrier location; as shown in FIG. 4b, in different OFDM symbols or different slots, first signals may be located at different subcarrier locations. First sequences in different OFDM symbols or different slots may be different. In different OFDM symbols or different slots, if the first signals are located at a same subcarrier location, it indicates that the subcarrier location of the first signals is at one frequency, that is, the first signals are not sent in a frequency hopping manner. In different OFDM symbols or different slots, if the first signals are located at different subcarrier locations, it indicates that the subcarrier locations of the first signals are at a plurality of frequencies, that is, the first signals are sent in a frequency hopping manner. It may be understood that this application is discussed in a framework that the first signal is based on OFDM. If the first signal is based on single-carrier (for example, a linear filtering single carrier QAM (SC-QAM)), an OFDM symbol in the OFDM framework may be replaced with a term in the single-carrier, such as a data block.

In some feasible implementations, the subcarrier spacing of the first signal in this embodiment of this application may be any type of subcarrier spacing used in a 5th generation mobile communication (5G) NR. The following briefly describes different types of subcarrier spacings used in the 5G NR. A radio frame length used in the 5G NR is 10 ms (milliseconds), and a subframe length is 1 ms. If each subframe includes only one slot, one radio frame includes 10 slots, and each slot includes 14 OFDM symbols (OFDM symbols in general sense in LTE and NR, that is, OFDM symbols including cyclic prefixes), a subcarrier spacing is 15 kHz (kilohertz), and a subcarrier spacing index is 0. If each subframe includes two slots, one radio frame includes 20 slots, and each slot includes 14 OFDM symbols, a subcarrier spacing is 30 kHz, and a subcarrier spacing index is 1. If each subframe includes four slots, one radio frame includes 40 slots, and each slot includes 14 OFDM symbols, a subcarrier spacing is 60 kHz, and a subcarrier spacing index is 2. If each subframe includes eight slots, one radio frame includes 80 slots, and each slot includes 14 OFDM symbols, a subcarrier spacing is 120 kHz, and a subcarrier spacing index is 3. If each subframe includes 16 slots, one radio frame includes 160 slots, and each slot includes 14 OFDM symbols, a subcarrier spacing is 240 kHz, and a subcarrier spacing index is 4. If each subframe includes 32 slots, one radio frame includes 320 slots, and each slot includes 14 OFDM symbols, a subcarrier spacing is 480 kHz, and a subcarrier spacing index is 5.

S304: The excitation device 10 sends first indication information to the receiving device 30.

In some feasible implementations, the excitation device 10 may send the first indication information to the receiving device 30 by using a massive MIMO antenna, and the first indication information may be sent in a form of signaling. The first indication information may be used to indicate the parameter of the first sequence. The parameter of the first sequence may include a sequence type of the first sequence, an initial value of the first sequence, and/or a sequence shift value of the first sequence.

In some feasible implementations, an execution sequence between step S304 and step S301 to step S303 is not limited. For example, step S304 may be performed before step S301 to step S303, step S304 may be performed after step S301 to step S303, or step S304 may be performed simultaneously with any one of step S301 to step S303.

S305: The backscatter device 20 receives the first signal from the excitation device 10.

S306: The backscatter device 20 modulates backscatter device data onto the first signal to obtain a second signal.

S307: The backscatter device 20 backscatters the second signal to the receiving device 30.

In some feasible implementations, the backscatter device 20 may receive the first signal from the excitation device 10, where the first signal carries the first sequence, and the first sequence is used to perform first scrambling on the backscatter device data. If the first signal can activate the backscatter device 20, the backscatter device 20 may obtain the backscatter device data. The backscatter device data may be data (for example, a backscatter device identifier) stored in the backscatter device 20, or data (for example, data such as temperature, humidity, and brightness) collected by a sensor connected to the backscatter device 20. The backscatter device 20 may modulate the obtained backscatter device data onto the received first signal to obtain the second signal, to implement the first scrambling on the obtained backscatter device data by using the first sequence carried on the first signal. The backscatter device 20 may backscatter the second signal to the receiving device 30 by using an antenna, where the second signal carries backscatter device data obtained after the first scrambling. In this embodiment of this application, because the first signal carries the first sequence, and the backscatter device modulates the backscatter device data onto the first signal to obtain the second signal, the first signal is randomized, so that the first scrambling on the backscatter device data by using the first sequence is equivalently implemented, and the anti-interference capability of the backscatter device data is improved. A modulation manner of the backscatter device 20 may include amplitude shift keying (ASK), frequency shift keying (FSK), BPSK, QAM, or the like.

In some feasible implementations, before performing first scrambling on the backscatter device data, the backscatter device 20 may perform channel encoding (for example, a low-density parity-check (LDPC) code) on the obtained backscatter device data, and modulate channel-encoded backscatter device data onto the first signal to obtain the second signal (that is, perform first scrambling). The backscatter device 20 may backscatter the second signal to the receiving device 30 by using the antenna. In this application, channel encoding is performed on the backscatter device data, to further improve the anti-interference capability of the backscatter device data.

In some feasible implementations, to facilitate scheduling and resource management by a backscatter communication network on communication of the backscatter device 20, a time resource of the backscatter communication may be allocated in a plurality of resource allocation manners. The following resource allocation manners may refer to configuration manners of a quantity of OFDM symbols (or corresponding time locations) used by the backscatter device to perform backscatter communication. (1) T=1 slot, and each slot includes 15 OFDM symbols (which herein refer to OFDM symbols without cyclic prefixes). (2) T=1 slot, and each slot includes 15 OFDM symbols (which herein refer to OFDM symbols without cyclic prefixes, and one OFDM symbol in the slot is not used to carry the backscatter device data, for example, the first OFDM symbol is not used to carry the backscatter device data, or for another example, the last OFDM symbol is not used to carry the backscatter device data). (3) T=1 slot, and each slot includes 14 OFDM symbols (which herein refer to OFDM symbols in general sense in LTE and NR, that is, OFDM symbols including cyclic prefixes). (4) T=1 slot, and each slot includes 14 OFDM symbols, where 13 OFDM symbols are used to carry the backscatter device data, and the first or the last OFDM symbol is not used to carry the backscatter device data. (5) T=1 slot, and each slot includes 14 OFDM symbols, where 12 OFDM symbols are used to carry the backscatter device data, and the first two OFDM symbols are not used to carry the backscatter device data, the last two OFDM symbols are not used to carry the backscatter device data, or the first OFDM symbol and the last OFDM symbol are not used to carry the backscatter device data. (6) T=2 slots, and each slot includes 14 OFDM symbols, where 13 OFDM symbols are used to carry the backscatter device data, and the first or the last OFDM symbol in each slot is not used to carry the backscatter device data. (7) T=4 slots, and each slot includes 14 OFDM symbols, where 13 OFDM symbols are used to carry the backscatter device data, and the first or the last OFDM symbol in each slot is not used to carry the backscatter device data. (8) T=8 slots, and each slot includes 14 OFDM symbols, where 13 OFDM symbols are used to carry the backscatter device data, and the first or the last OFDM symbol in each slot is not used to carry the backscatter device data. (9) T=12 slots, and each slot includes 14 OFDM symbols, where 13 OFDM symbols are used to carry the backscatter device data, and the first or the last OFDM symbol in each slot is not used to carry the backscatter device data. (10) T=16 slots, and each slot includes 14 OFDM symbols, where 13 OFDM symbols are used to carry the backscatter device data, and the first or the last OFDM symbol in each slot is not used to carry the backscatter device data.

In the foregoing resource configuration manners in which T>1, time used to carry backscatter device data in each of the first T−1 slots may be 14 OFDM symbols, time used to carry the backscatter device data in the last slot may be 13 OFDM symbols or 12 OFDM symbols, and the last one or two OFDM symbols in the last slot are not used to carry the backscatter device data. Alternatively, in the foregoing resource configuration manners in which T>1, time used to carry backscatter device data in each of the last T−1 slots may be 14 OFDM symbols, time used to carry the backscatter device data in the first slot may be 13 OFDM symbols or 12 OFDM symbols, and the first one or two OFDM symbols in the first slot are not used to carry the backscatter device data. Time not used to carry the backscatter device data may indicate that the time is used as guard time (in which the backscatter device does not backscatter data). The guard time can prevent time inaccuracy that is caused by an error of a clock or a component of the backscatter device and that interferes with communication of another user or is unfavorable for a receive end (for example, the receiving device) to receive and process data.

In some other feasible implementations, in the foregoing resource allocation manners, each slot includes L OFDM symbols. When T=2/4/8/12/16 slots, $L_1$ OFDM symbols in each of the first T−1 slots are used to carry the backscatter device data, and $L_2$ OFDM symbols in the last slot are used to carry the backscatter device data, where $L \geq L_1 \geq L_2$. For example, T=8 slots, and each slot includes L=14 OFDM symbols. $L_1$=13 OFDM symbols in each of the first 7 (T−1=8−1=7) slots are used to carry the backscatter device data, and a length of the first OFDM symbol or the last OFDM symbol in each of the first 7 slots is used as guard time. $L_2$=12 OFDM symbols in the last slot are used to carry the backscatter device data, and a length of the first two/the last two/the first and the last OFDM symbols in the last slot is used as guard time.

In some other feasible implementations, each slot in the foregoing resource allocation manners includes L OFDM symbols, and the first K OFDM symbols in each slot are not used to carry the backscatter device data (for example, the first K OFDM symbols are used to send a pilot signal or are used to estimate a channel between the excitation device and the receiving device). When T=2/4/8/12/16 slots, $L_1$ OFDM symbols in each of the first T−1 slots are used to carry the backscatter device data, and $L_2$ OFDM symbols in the last slot are used to carry the backscatter device data, where $L \geq L_1 \geq L_2$. For example, K=1, T=8 slots, and each slot includes L=14 OFDM symbols. $L_1$=12 OFDM symbols in each of the first 7 (T−1=8−1=7) slots are used to carry the backscatter device data, the first OFDM symbol in each of the first 7 slots is used to send the pilot signal, or is used to estimate the channel between the excitation device and the receiving device, and a length of the last OFDM symbol is used as guard time. $L_2$=11 OFDM symbols in the last slot are used to carry the backscatter device data, the first OFDM symbol in the last slot is used to send the pilot signal, or is used to estimate the channel between the excitation device and the receiving device, and a length of the last two OFDM symbols is used as the guard time.

Figure 5:
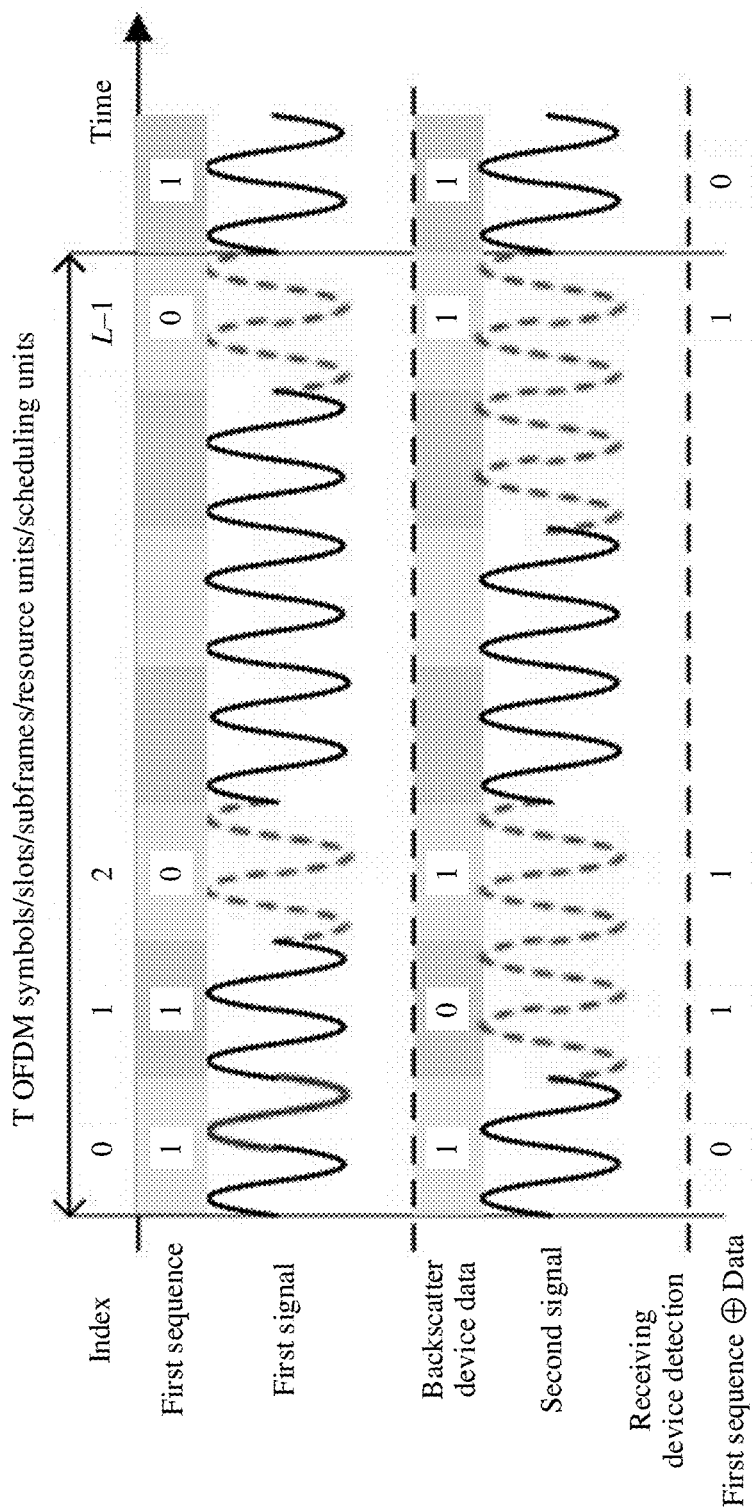
FIG. 5 is a schematic diagram of a relationship between a first signal and a second signal according to an embodiment of this application.
Figure 6:
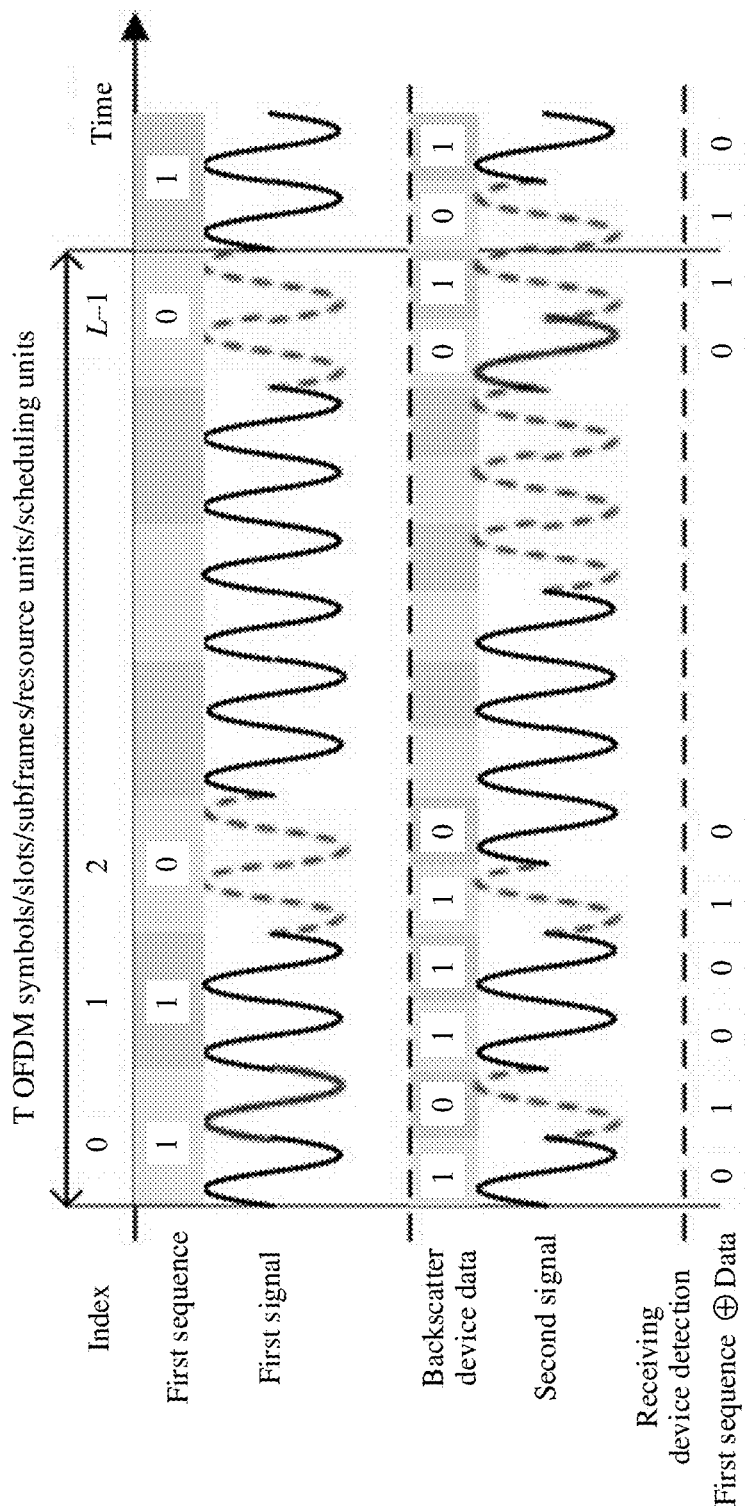
FIG. 6 is a schematic diagram of another relationship between a first signal and a second signal according to an embodiment of this application.

In some feasible implementations, there are a plurality of relationships between a data symbol in the first signal and a data symbol in the second signal in terms of time resource. FIG. 5 is a schematic diagram of a relationship between a first signal and a second signal according to an embodiment of this application. In FIG. 5, T and L are positive integers, and a BPSK modulation manner is used on both the excitation device 10 and the backscatter device 20. When an element (or referred to as a bit) in the first sequence is 1, a phase of the first signal remains unchanged; and when the element in the first sequence is 0, the phase of the first signal is inverted (offset by 180 degrees). When the backscatter device data is 1, a phase of the second signal is consistent with that of the first signal; and when the backscatter device data is 0, the phase of the second signal is an inverse phase of the phase of the first signal. In FIG. 5, a backscatter device data symbol is carried on a time length of a data symbol (which herein refers to a data symbol corresponding to an element in the first sequence) on the first signal. In some other feasible implementations, a time length of one data symbol on the first signal may carry a plurality of backscatter device data symbols, or a time length of a plurality of data symbols on the first signal may carry one backscatter device data symbol. FIG. 6 is a schematic diagram of another relationship between a first signal and a second signal according to an embodiment of this application. In FIG. 6, two backscatter device data symbols are carried on a time length of one data symbol on the first signal.

In some feasible implementations, a time length of one data symbol (which herein refers to a data symbol corresponding to an element in the first sequence) on the first signal may be equal to a time length of M OFDM symbols (which herein may be OFDM symbols including cyclic prefixes, or may be OFDM symbols not including cyclic prefixes). M may be an integer greater than or equal to 1, for example, M=1, M=7, or M=14. In some other feasible implementations, a time length of one data symbol on the first signal may be equal to a time length of M slots in backscatter communication, a time length of M backscatter communication symbols, or a time length corresponding to M resource units. The resource unit may be used to represent units of time resources and frequency resources used by the excitation device 10 or the backscatter device 20 to perform data transmission.

In other implementations, elements (or referred to as bits) in a plurality of first sequences correspond to a data symbol in one first signal.

S308: The receiving device 30 receives the first indication information from the excitation device 10, and determines the parameter of the first sequence from the first indication information.

S309: The receiving device 30 determines the first sequence based on the parameter of the first sequence.

In some feasible implementations, the first indication information is used to indicate the parameter of the first sequence. For an implementation of determining the first sequence by the receiving device 30 in step S309 in this embodiment of this application, refer to the implementation of determining the first sequence by the excitation device 10 in step S301. Details are not described herein again.

S310: The receiving device 30 receives the second signal from the backscatter device 20.

S311: The receiving device 30 demodulates the second signal based on the first sequence, to obtain the backscatter device data carried on the second signal.

In some feasible implementations, the receiving device 30 receives the second signal backscattered by the backscatter device 20, where the second signal carries backscatter device data obtained after the first scrambling. The receiving device 30 may demodulate the second signal based on the first sequence determined by the receiving device 30, to obtain the backscatter device data carried on the second signal. Optionally, after demodulating the second signal based on the first sequence, the receiving device 30 may further perform channel decoding on a demodulated second signal, to obtain the backscatter device data carried on the second signal. Because the backscatter device data in this application is scrambled by using the first sequence to obtain the second signal, anti-interference capabilities of the backscatter device data and/or the second signal are high, and a probability increases that data obtained by the receiving device by demodulating the second signal after receiving the second signal is the backscatter device data before demodulation. Therefore, accuracy of the received backscatter device data can be improved.

In some feasible implementations, the receiving device 30 may further receive the first signal sent by the excitation device 10. In this embodiment of this application, the first signal received by the receiving device 30 is an interference signal of the second signal. Therefore, after receiving the first signal, the receiving device 30 in this embodiment of this application does not process the first signal.

In this embodiment of this application, the excitation device sends the first signal that carries the first sequence (a random or pseudo-random sequence). After receiving the first signal, the backscatter device modulates the backscatter device data onto the first signal to obtain the second signal, and backscatters the second signal to the receiving device, to implement first scrambling on the backscatter device data by the first sequence. The receiving device demodulates the received second signal based on the determined first sequence, to obtain the backscatter device data carried on the second signal. In this embodiment of this application, the first signal is randomized by adding the first sequence on the first signal, to equivalently implement scrambling on the second signal or the backscatter device data, so that persistent interference in a backscatter communication process is reduced, an anti-interference capability and network performance of a backscatter communication network is improved, and an applicable range of backscatter communication is increased. In addition, because the backscatter device is usually a passive or semi-active device, scrambling on the second signal or the backscatter device data is equivalently implemented by using the first sequence, so that calculation complexity on the backscatter device can be reduced, power consumption can be saved, and costs can be reduced.

Figure 7A:
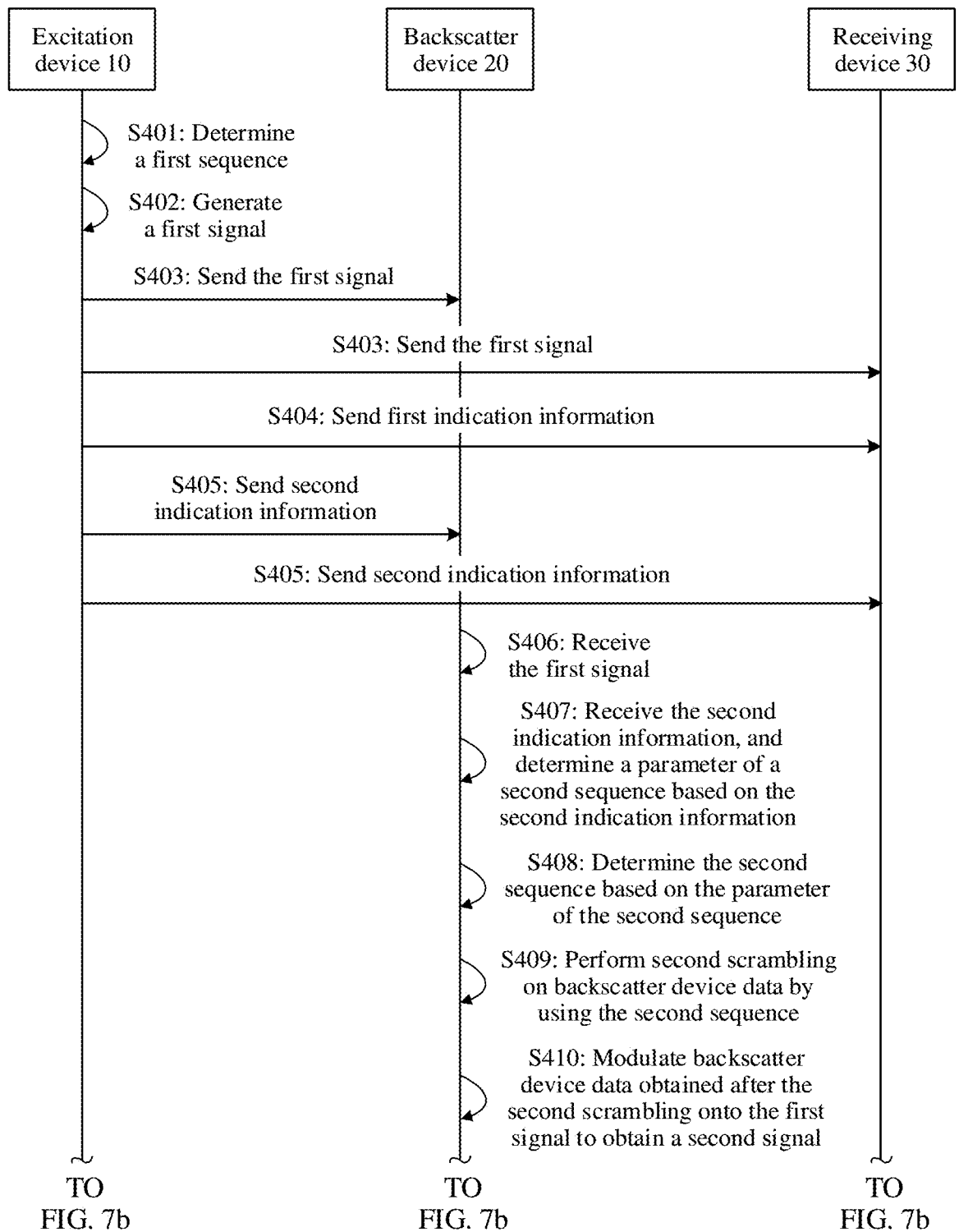
FIG. 7a and FIG. 7b are another schematic flowchart of a backscatter communication method according to an embodiment of this application.
Figure 7B:
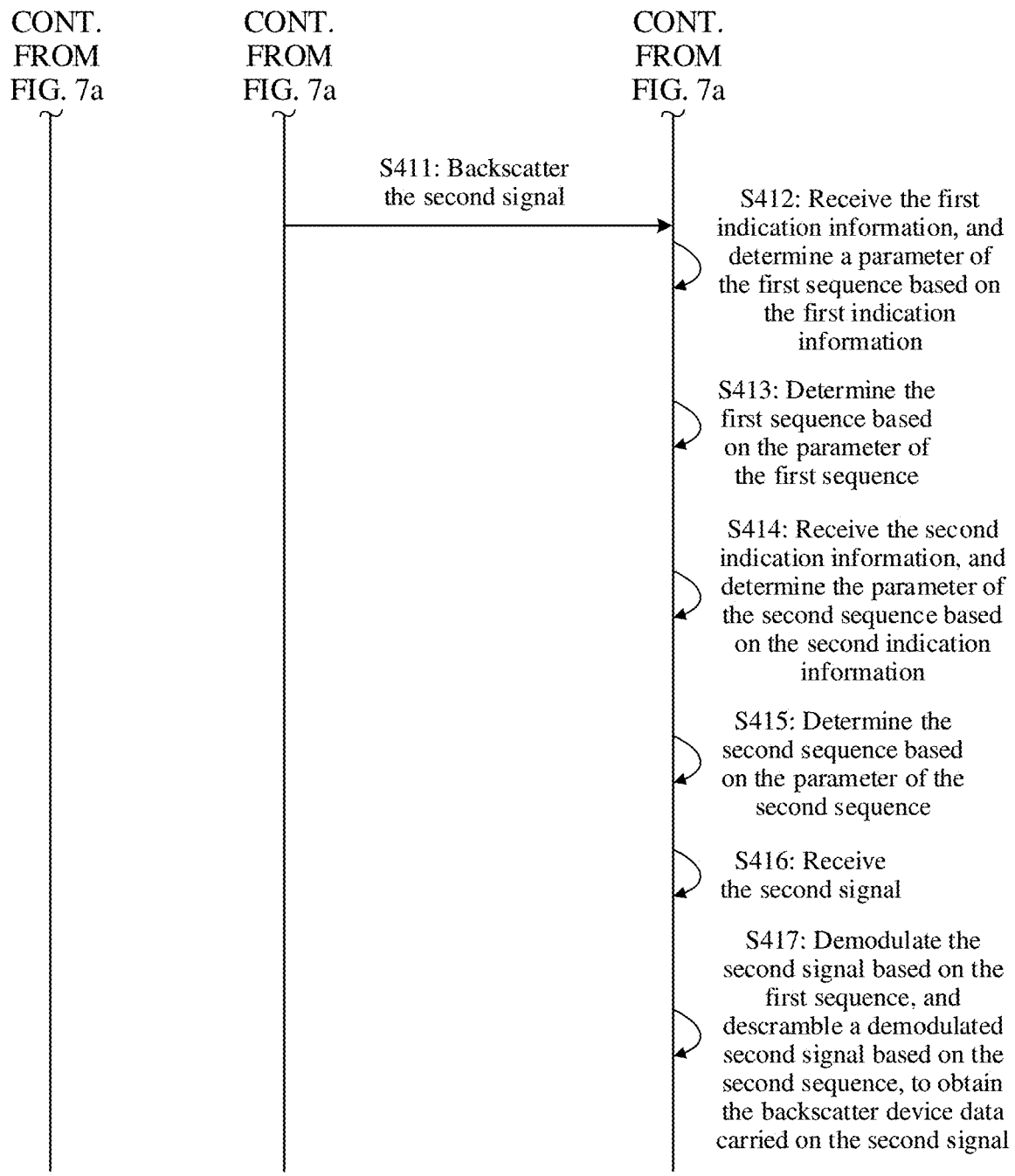

The backscatter communication method provided in this application not only can perform first scrambling on the backscatter device data, but can also perform second scrambling on the backscatter device data, to further improve an anti-interference capability of backscatter device data, reduce persistent interference in a backscatter communication process, and improve the anti-interference capability and network performance of the backscatter communication network. FIG. 7a and FIG. 7b are another schematic flowchart of a backscatter communication method according to an embodiment of this application. The backscatter communication method is applicable to an excitation device 10, a backscatter device 20, and a receiving device 30. The excitation device in this embodiment of this application corresponds to a base station in an LTE or NR network. The backscatter communication method provided in this embodiment of this application includes the following steps.

S401: The excitation device 10 determines a first sequence.

S402: The excitation device 10 generates a first signal.

S403: The excitation device 10 sends the first signal.

S404: The excitation device 10 sends first indication information to the receiving device 30.

In some feasible implementations, for an implementation of step S401 to step S404 in this embodiment of this application, refer to an implementation of step S301 to step S304 in FIG. 3a. Details are not described herein again.

S405: The excitation device 10 sends second indication information to the backscatter device 20 and the receiving device 30.

In some feasible implementations, the second indication information may be sent in a form of signaling. The second indication information may be used to indicate a parameter of a second sequence, and the parameter of the second sequence is used to determine the second sequence.

In some feasible implementations, an execution sequence between step S404 and step S405 is not limited. For example, step S404 may be performed before step S405, step S404 may be performed after step S405, or step S404 may be performed simultaneously with step S405.

S406: The backscatter device 20 receives the first signal from the excitation device 10.

In some feasible implementations, the backscatter device 20 may receive the first signal from the excitation device 10, where the first signal carries the first sequence, and the first sequence is used to perform first scrambling on the backscatter device data.

S407: The backscatter device 20 receives the second indication information from the excitation device 10, and determines the parameter of the second sequence from the second indication information.

S408: The backscatter device 20 determines the second sequence based on the parameter of the second sequence.

In some feasible implementations, the second sequence may be a known random sequence or pseudo-random sequence. The pseudo-random sequence may include a Gold sequence, an m sequence, a linear feedback shift register (LFSR) sequence, a Kasami sequence, a complement sequence, a Zadoff-Chu sequence, a quadratic residue sequence, a double prime sequence, a Frank sequence, a Golomb sequence, a Chirp sequence, a P4 sequence, a multiphase sequence, a Golay sequence, or the like.

In some feasible implementations, if the first signal can activate the backscatter device 20, the backscatter device 20 may receive the second indication information from the excitation device 10, and determine the parameter of the second sequence from the second indication information. The backscatter device 20 may determine the second sequence based on the parameter of the second sequence, where the second sequence is a binary sequence. The second indication information may be used to indicate the parameter of the second sequence. The parameter of the second sequence may include a sequence type of the second sequence, an initial value of the second sequence, and/or a sequence shift value of the second sequence. The sequence type and the sequence shift value of the second sequence may be preset. For example, the sequence type of the second sequence is the m sequence, and the sequence shift value $N_{C2}$ of the second sequence is 5. The initial value of the second sequence may be determined based on at least one of the following information: a physical layer ID of backscatter communication, a physical layer ID of the excitation device, a physical layer ID of the receiving device, a slot index of the backscatter communication, an OFDM symbol index of the backscatter communication, a subcarrier spacing of the backscatter communication, a radio frame index of the backscatter communication, and/or a subframe index of the backscatter communication. Optionally, the information used to determine the initial value of the second sequence may further include at least one of a carrier frequency index of the backscatter communication, a backscatter communication frequency index, and/or a bandwidth part index of the backscatter communication.

In some feasible implementations, the initial value of the second sequence is determined based on the following information: a physical layer identifier (for example, a radio network temporary identifier or a physical layer cell identifier) of backscatter communication, a slot index of the backscatter communication, an OFDM symbol index of the backscatter communication, a subcarrier spacing of the backscatter communication, and a subframe index of the backscatter communication.

A manner of determining the second sequence is briefly described by using an example in which the sequence type of the second sequence is the m sequence. It is assumed that the sequence type of the second sequence is an m sequence with a sequence length of 15, and the sequence shift value $N_{C2}$ is 5. A formula for generating the m sequence $c_2(k)$ with the sequence length of 15 may be represented as:

$$c_2(k)=x(k+N_{C2})=x(k+5), \quad (4\text{-}1)$$

where a value range of k is integers ranging from 0 to 14 (including 0 and 14). It is assumed that x(k) may be determined by using formula (4-2):

$$x(k+5)=(x(k+2)+x(k))\bmod 2, \quad (4\text{-}2)$$

Optionally, the formula used to determine x(k) may be determined by using any physical layer ID in the physical layer identifier of the backscatter communication, the physical layer ID of the excitation device, or the physical layer ID of the receiving device. For example, as shown in table 1, there are two formulas for determining x(k). When a physical layer ID or an index is 1, x(k) is determined by using formula (4-2); or when a physical layer ID or an index is 2, x(k) is determined by using formula (4-3) in the table 1. If a physical layer ID that is of the excitation device and that is received by the backscatter device from the excitation device is 2, a formula for determining x(k) may be x(k+5)=(x(k+3)+x(k)) mod 2

TABLE 1

| Index (Physical layer ID) | Formula for determining x(k) |
|---|---|
| 1 | x(k + 5) = (x(k + 2) + x(k)) mod 2 |
| 2 | x(k + 5) = (x(k + 3) + x(k)) mod2, (4-3) |

In a process of generating the pseudo-random sequence, an initial value of the pseudo-random sequence needs to be specified. The initial value $c_{init}$ of the second sequence may be represented as:

$$c_{init} = \left(2^{17}\left(N_{symb}^{slot}N_{s,f}^{u} + l + 1\right)\left(2N_{ID}^{nSCID} + 1\right) + 2N_{ID}^{nSCID} + n_{SCID}\right) \mod 2^{16}, \quad (4\text{-}4)$$

or $$c_{init} = \left(2^{17}\left(N_{symb}^{slot}N_{s,f}^{u} + l + 1\right)(2N_{ID} + 1) + 2N_{ID}\right) \mod 2^{16}, \quad (4\text{-}5)$$

$N_{symb}^{slot}$ represents a quantity of OFDM symbols in one slot, $N_{s,f}^{u}$ represents a quantity of slots in one radio frame, u represents a subcarrier spacing index, l represents an OFDM symbol index in one slot, $N_{ID}^{nscid}$ or $N_{ID}$ represents a scrambling ID (which may be specifically any physical layer ID in the physical layer ID of the backscatter communication, the physical layer ID of the excitation device, and the physical layer ID of the receiving device), and $n_{SCID}$ is 0 or 1 depending on a current application scenario of the sequence. Optionally, after the initial value $c_{init}$ is calculated according to formula (4-4) or formula (4-5), if the initial value is not a binary sequence, values of x(0), x(1), x(2), . . . , x(15) may be separately obtained by using $$c_{init} = \sum_{k=0}^{15} x(k)2^{k}.$$

In some feasible implementations, if a length required by the second sequence exceeds a length of the pseudo-random sequence (for example, the foregoing $c_2(k)$), an actual scrambling sequence (the second sequence herein) is obtained from the pseudo-random sequence starting from a start position of the pseudo-random sequence again, that is, from the pseudo-random sequence in a cyclic manner.

In some feasible implementations, the backscatter device 20 may use the entire generated m sequence as the second sequence, or may select a segment of m sequence from the entire generated m sequence as the second sequence, for example, use the first 8 bits of the generated m sequence as the second sequence. This is not limited in this embodiment of this application.

In some feasible implementations, the initial value of the second sequence may be further indicated by the excitation device 10 or the receiving device 30. To be specific, the backscatter device 20 directly receives the initial value of the second sequence indicated by the excitation device 10 or the receiving device 30, and then determines the second sequence based on the initial value of the second sequence, the sequence type of the second sequence, and the sequence shift value of the second sequence. For example, after determining the initial value of the second sequence, the excitation device 10 or the receiving device 30 may send, to the backscatter device 20 in a form of signaling, indication information that carries the initial value of the second sequence.

In some feasible implementations, an execution sequence between step S406 and steps S407 and S408 is not limited. For example, step S406 may be performed before steps S407 and S408, step S406 may be performed after steps S407 and S408, or step S406 may be performed simultaneously with either of steps S407 and S408.

S409: The backscatter device 20 performs second scrambling on the backscatter device data by using the second sequence.

S410: The backscatter device 20 modulates backscatter device data obtained after the second scrambling onto the first signal to obtain a second signal.

S411: The backscatter device 20 backscatters the second signal to the receiving device 30.

In some feasible implementations, the second sequence may be a binary sequence. The backscatter device 20 may obtain the backscatter device data. The backscatter device data may be data (for example, a backscatter device identifier) stored in the backscatter device 20, or data (for example, data such as temperature, humidity, and brightness) collected by a sensor connected to the backscatter device 20. The backscatter device 20 may perform a bit-by-bit exclusive OR operation on the second sequence and the obtained backscatter device data, to implement the second scrambling on the backscatter device data by using the second sequence. The backscatter device 20 may modulate the backscatter device data obtained after the second scrambling (namely, the bit-by-bit exclusive OR operation) onto the received first signal to obtain the second signal, to implement the first scrambling on the backscatter device data by using the first sequence carried on the first signal. The backscatter device 20 may backscatter the second signal to the receiving device 30 by using an antenna. A modulation manner of the backscatter device 20 may include ASK, FSK, BPSK, QAM, or the like. In this application, the backscatter device data is randomized by directly performing the second scrambling on the backscatter device data by using the second sequence, so that the anti-interference capability of the backscatter device data can be further improved, and demodulation performance of the receiving device is further improved.

In some feasible implementations, after obtaining the backscatter device data, the backscatter device 20 may perform channel encoding on the obtained backscatter device data, perform second scrambling on channel-encoded backscatter device data by using the second sequence, then modulate backscatter device data obtained after the second scrambling onto the first signal to obtain the second signal, and finally backscatter the second signal to the receiving device 30.

In some feasible implementations, a mathematical representation of the second scrambling on the backscatter device data is as follows:

$$\tilde{b}(k)=(b(k)+c_2(k)) \mod 2, \quad (4\text{-}6)$$

$\tilde{b}(k)$ represents the backscatter device data obtained after the second scrambling, $\tilde{b}(k)$ b(k) represents the backscatter device data (which may be backscatter device data without channel encoding, or may be backscatter device data after channel encoding, this is not limited herein), and $c_2$ (k) indicates the second sequence. For example, if b(k) is 10111011, and $c_2(k)$ is 11001010, $c_2(k)$ is a value, namely, 01110001, obtained by performing bit-by-bit exclusive OR on $b(k)$ and $c_2(k)$.

S412: The receiving device 30 receives the first indication information from the excitation device 10, and determines a parameter of the first sequence from the first indication information.

S413: The receiving device 30 determines the first sequence based on the parameter of the first sequence.

In some feasible implementations, the first indication information is used to indicate the parameter of the first sequence. For an implementation of determining the first sequence by the receiving device 30 in step S413 in this embodiment of this application, refer to the implementation of determining the first sequence by the excitation device 10 in step S401. Details are not described herein again.

S414: The receiving device 30 receives the second indication information from the excitation device 10, and determines the parameter of the second sequence from the second indication information.

S415: The receiving device 30 determines the second sequence based on the parameter of the second sequence.

In some feasible implementations, the second indication information is used to indicate the parameter of the second sequence. For an implementation of determining the second sequence by the receiving device 30 in step S415 in this embodiment of this application, refer to the implementation of determining the second sequence by the backscatter device 20 in step S408. Details are not described herein again.

S416: The receiving device 30 receives the second signal from the backscatter device 20.

S417: The receiving device 30 demodulates the second signal based on the first sequence, and descrambles a demodulated second signal based on the second sequence, to obtain the backscatter device data carried on the second signal.

In some feasible implementations, the second signal carries the backscatter device data. The receiving device 30 demodulates the received second signal based on the first sequence to obtain demodulated data, and then descrambles the demodulated data based on the second sequence, to obtain the backscatter device data carried on the second signal. Optionally, after descrambling the demodulated data based on the second sequence, the receiving device 30 may further perform channel decoding on descrambled data, to obtain the backscatter device data carried on the second signal.

In this embodiment of this application, the excitation device sends the first signal that carries the first sequence (a random or pseudo-random sequence), and sends the second indication information, where the second indication information is used to indicate the parameter of the second sequence and indicate the backscatter device to perform the second scrambling. After receiving the first signal, the backscatter device performs second scrambling on the backscatter device data by using the second sequence (a simple pseudo-random sequence, such as an m sequence) determined based on the parameter of the second sequence, modulates the backscatter device data obtained after the second scrambling onto the first signal to obtain the second signal, and backscatters the second signal. The receiving device demodulates the received second signal based on the determined first sequence, and descrambles the demodulated second signal based on the determined second sequence, to obtain the backscatter device data carried on the second signal. In this embodiment of this application, the first signal is randomized by adding the first sequence on the first signal, and the backscatter device data is randomized by directly performing the second scrambling on the backscatter device data by using the second sequence. Therefore, persistent interference in a backscatter communication process is further reduced, an anti-interference capability and network performance of a backscatter communication network is improved, and demodulation performance of the receiving device is further improved.

Figure 8A:
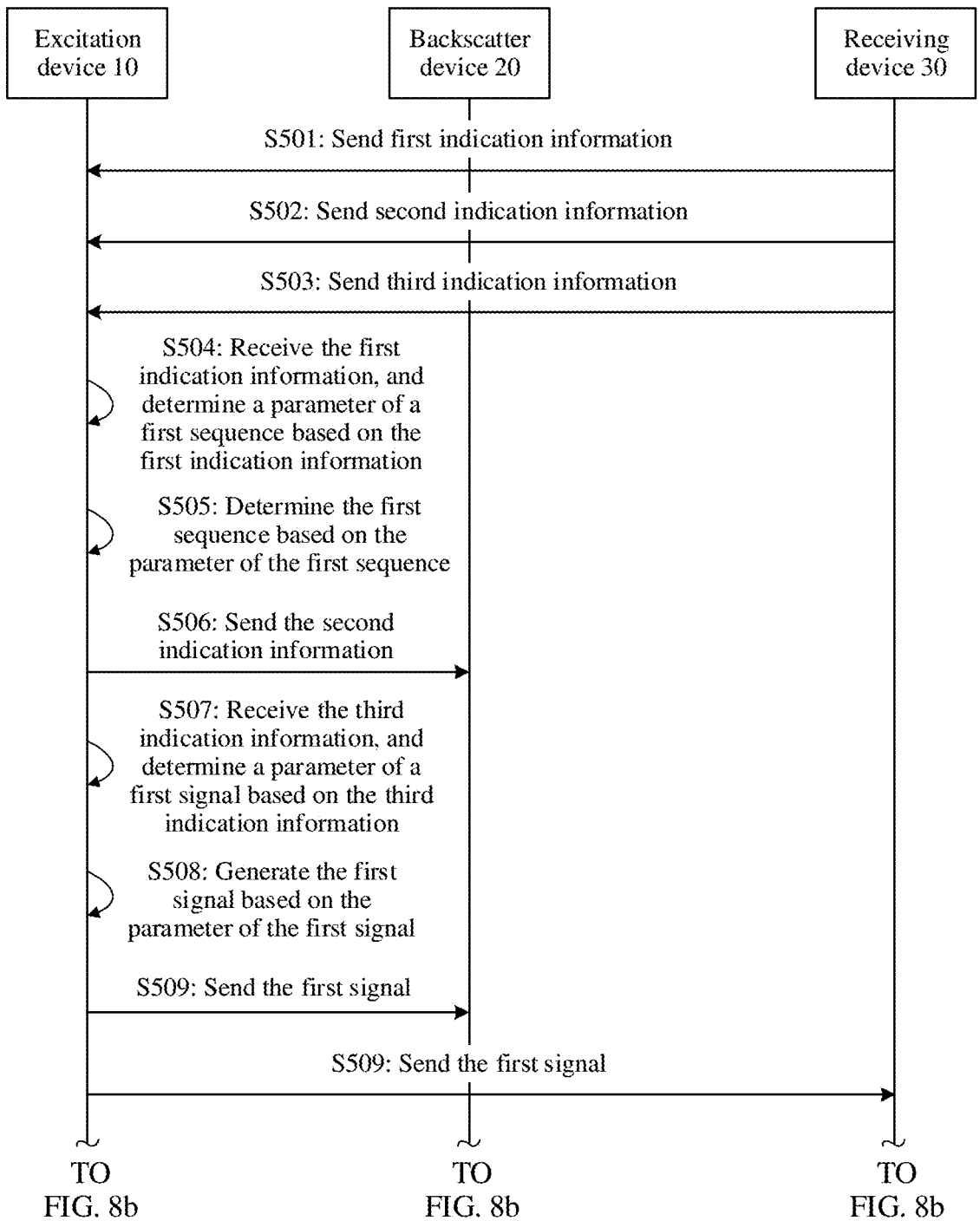

This embodiment of this application describes a data exchange process of backscatter communication when the excitation device is user equipment. FIG. 8*a* to FIG. 8*c* are still another schematic flowchart of a backscatter communication method according to an embodiment of this application. The backscatter communication method is applicable to an excitation device 10, a backscatter device 20, and a receiving device 30. The excitation device in this embodiment of this application corresponds to user equipment in an LTE or NR network. The backscatter communication method provided in this embodiment of this application includes the following steps.

S501: The receiving device 30 sends first indication information to the excitation device 10.

S502: The receiving device 30 sends second indication information to the excitation device 10.

S503: The receiving device 30 sends third indication information to the excitation device 10.

In some feasible implementations, the receiving device 30 may send the first indication information, the second indication information, and the third indication information to the excitation device 10 by using an antenna. The first indication information, the second indication information, and the third indication information may all be sent in a form of signaling. The first indication information is used to indicate a parameter of a first sequence, and the parameter of the first sequence may include at least one parameter in a sequence type of the first sequence, an initial value of the first sequence, and a sequence shift value of the first sequence. The second indication information is used to indicate a parameter of a second sequence, and the parameter of the second sequence may include at least one parameter in a sequence type of the second sequence, an initial value of the second sequence, and a sequence shift value of the second sequence. The third indication information is used to indicate a parameter of a first signal, and the parameter of the first signal may include at least one parameter in a subcarrier location of the first signal, a subcarrier spacing of the first signal, a time length of the first signal, a frequency hopping pattern of the first signal, and transmit power of the first signal.

S504: The excitation device 10 receives the first indication information from the receiving device 30, and determines the parameter of the first sequence from the first indication information.

S505: The excitation device 10 determines the first sequence based on the parameter of the first sequence.

In some feasible implementations, for an implementation of step S505 in this embodiment of this application, refer to an implementation of step S301 in FIG. 3*a*. Details are not described herein again.

S506: The excitation device 10 receives the second indication information from the receiving device 30, and sends the second indication information to the backscatter device 20.

S507: The excitation device 10 receives the third indication information from the receiving device 30, and determines the parameter of the first signal from the third indication information.

S508: The excitation device 10 generates the first signal based on the parameter of the first signal.

S509: The excitation device 10 sends the first signal.

In some feasible implementations, for an implementation of step S508 and step S509 in this embodiment of this application, refer to an implementation of step S302 and step S303 in FIG. 3a. Details are not described herein again.

S510: The backscatter device 20 receives the second indication information from the excitation device 10, and determines the parameter of the second sequence from the second indication information.

S511: The backscatter device 20 determines the second sequence based on the parameter of the second sequence.

In some feasible implementations, for an implementation of step S511 in this embodiment of this application, refer to an implementation of step S408 in FIG. 7a. Details are not described herein again.

S512: The backscatter device 20 receives the first signal from the excitation device 10.

S513: The backscatter device 20 performs second scrambling on backscatter device data by using the second sequence.

S514: The backscatter device 20 modulates backscatter device data obtained after the second scrambling onto the first signal to obtain a second signal.

S515: The backscatter device 20 backscatters the second signal to the receiving device 30.

In some feasible implementations, for an implementation of step S513 to step S515 in this embodiment of this application, refer to an implementation of step S409 to step S411 in FIG. 7a and FIG. 7b. Details are not described herein again.

S516: The receiving device 30 determines the parameter of the first sequence, and determines the first sequence based on the parameter of the first sequence.

In some feasible implementations, for an implementation of determining the first sequence by the receiving device 30 in step S516 in this embodiment of this application, refer to the implementation of determining the first sequence by the excitation device 10 in step S505. Details are not described herein again.

S517: The receiving device 30 determines the parameter of the second sequence, and determines the second sequence based on the parameter of the second sequence.

In some feasible implementations, for an implementation of determining the second sequence by the receiving device 30 in step S517 in this embodiment of this application, refer to the implementation of determining the second sequence by the backscatter device 20 in step S511. Details are not described herein again.

S518: The receiving device 30 receives the second signal from the backscatter device 20.

S519: The receiving device 30 demodulates the second signal based on the first sequence, and descrambles a demodulated second signal based on the second sequence, to obtain the backscatter device data carried on the second signal.

In some feasible implementations, for an implementation of step S518 and step S519 in this embodiment of this application, refer to an implementation of step S416 and step S417 in FIG. 7b. Details are not described herein again.

In this embodiment of this application, the first signal is randomized by adding the first sequence on the first signal, and the backscatter device data is randomized by directly performing the second scrambling on the backscatter device data by using the second sequence. Therefore, persistent interference in a backscatter communication process is further reduced, an anti-interference capability and network performance of a backscatter communication network is improved, and demodulation performance of the receiving device is further improved.

The backscatter communication method in the embodiments of this application is described above in detail. To better implement the foregoing solutions in the embodiments of this application, the embodiments of this application further provide corresponding devices.

Figure 9:
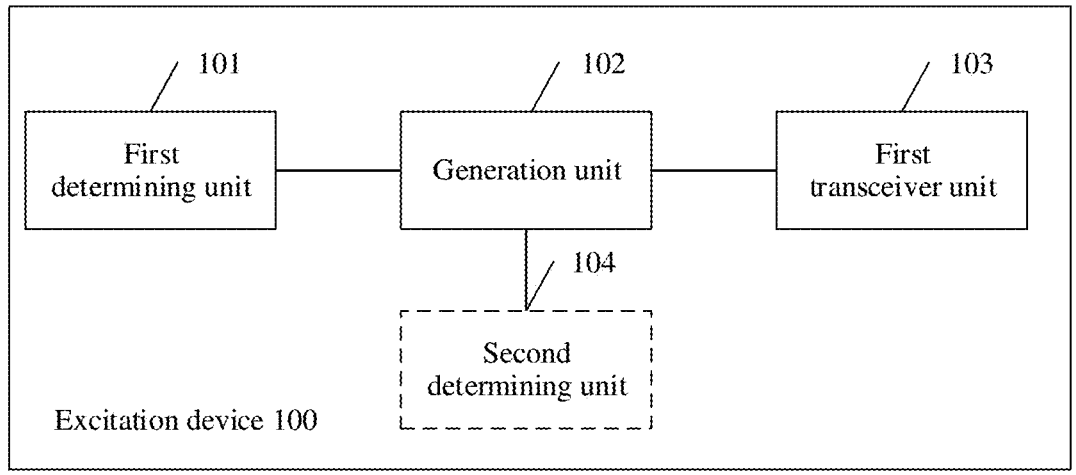
FIG. 9 is a schematic diagram of a structure of an excitation device according to an embodiment of this application.

FIG. 9 is a schematic diagram of a structure of an excitation device 100 according to an embodiment of this application. As shown in FIG. 9, the excitation device 100 may include: a first determining unit 101, configured to determine a first sequence; a generation unit 102, configured to generate a first signal; and a first transceiver unit 103, configured to send the first signal generated by the generation unit 102. The first signal carries the first sequence determined by the first determining unit 101, and the first sequence is used to perform first scrambling on backscatter device data.

In some feasible implementations, the first determining unit 101 is further configured to determine a parameter of the first sequence, and the parameter of the first sequence is used to determine the first sequence.

In some feasible implementations, the first transceiver unit 103 is further configured to send first indication information to a receiving device, and the first indication information is used to indicate the parameter of the first sequence.

In some feasible implementations, the parameter of the first sequence includes at least one of the following information: a sequence type of the first sequence, an initial value of the first sequence, and a sequence shift value of the first sequence.

In some feasible implementations, the parameter of the first sequence is determined based on at least one of the following information: a physical layer identifier of backscatter communication, a physical layer identifier of the excitation device, a physical layer identifier of a receiving device, time domain information of the first signal, and a frequency of the first signal.

In some feasible implementations, the excitation device 100 further includes a second determining unit 104. The second determining unit 104 is configured to determine a parameter of the first signal.

In some feasible implementations, the parameter of the first signal includes at least one of the following information: a subcarrier location of the first signal, a subcarrier spacing of the first signal, a time length of the first signal, a frequency hopping pattern of the first signal, and transmit power of the first signal.

In some feasible implementations, the first transceiver unit 103 is further configured to send second indication information to a backscatter device and a receiving device. The second indication information is used to indicate a parameter of a second sequence, and the second sequence is used to perform second scrambling on the backscatter device data.

In some feasible implementations, the first transceiver unit 103 is configured to: receive second indication information from a receiving device, and send the second indication information to a backscatter device. The second indication information is used to indicate a parameter of a second sequence, and the second sequence is used to perform second scrambling on the backscatter device data.

In some feasible implementations, the parameter of the second sequence includes at least one of the following information: a sequence type of the second sequence, an initial value of the second sequence, and a sequence shift value of the second sequence.

The first determining unit 101, the generation unit 102, and/or the second determining unit 104 may be one unit, for example, a processing unit.

During specific implementation, for an implementation of each unit, methods and functions performed by the excitation device in the foregoing embodiment may be performed with reference to the corresponding descriptions of the excitation device in the method embodiments shown in FIG. 3a and FIG. 3b, FIG. 7a and FIG. 7b, or FIG. 8a to FIG. 8c.

Figure 10:
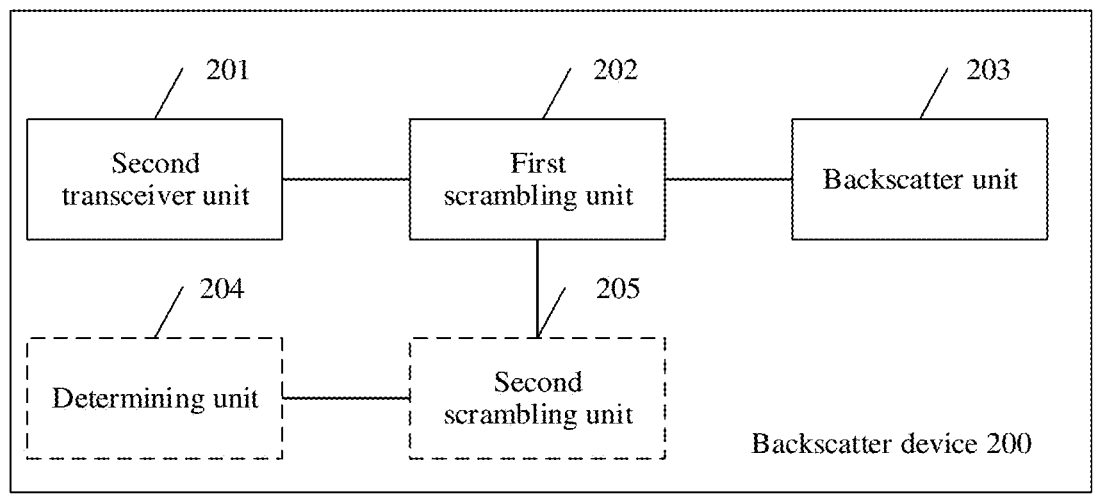
FIG. 10 is a schematic diagram of a structure of a backscatter device according to an embodiment of this application.

FIG. 10 is a schematic diagram of a structure of a backscatter device 200 according to an embodiment of this application. As shown in FIG. 10, the backscatter device 200 may include: a second transceiver unit 201, configured to receive a first signal from an excitation device, where the first signal carries a first sequence, and the first sequence is used to perform first scrambling on backscatter device data; a first scrambling unit 202, configured to modulate the backscatter device data onto the first signal received by the second transceiver unit 201, to obtain a second signal, where the second signal carries backscatter device data obtained after the first scrambling; and a backscatter unit 203, configured to backscatter, to a receiving device, the second signal obtained after being scrambled by the first scrambling unit 202.

In some feasible implementations, the backscatter device 200 further includes a determining unit 204 and a second scrambling unit 205. The determining unit 204 is configured to determine a second sequence. The second scrambling unit 205 is configured to perform second scrambling on the backscatter device data by using the second sequence determined by the determining unit 204. The first scrambling unit 202 is specifically configured to modulate backscatter device data, obtained after the second scrambling by the second scrambling unit 205, onto the first signal received by the second transceiver unit 201, to obtain the second signal.

In some feasible implementations, the second transceiver unit 201 is further configured to receive second indication information from the excitation device and/or the receiving device, where the second indication information is used to indicate a parameter of the second sequence.

In some feasible implementations, the parameter of the second sequence includes at least one of the following information: a sequence type of the second sequence, an initial value of the second sequence, and a sequence shift value of the second sequence.

The first scrambling unit 202, the backscatter unit 203, the determining unit 204, and/or the second scrambling unit 205 may be one unit, for example, a processing unit.

During specific implementation, for an implementation of each unit, methods and functions performed by the backscatter device in the foregoing embodiment may be performed with reference to the corresponding descriptions of the backscatter device in the method embodiments shown in FIG. 3a and FIG. 3b, FIG. 7a and FIG. 7b, or FIG. 8a to FIG. 8c.

Figure 11:
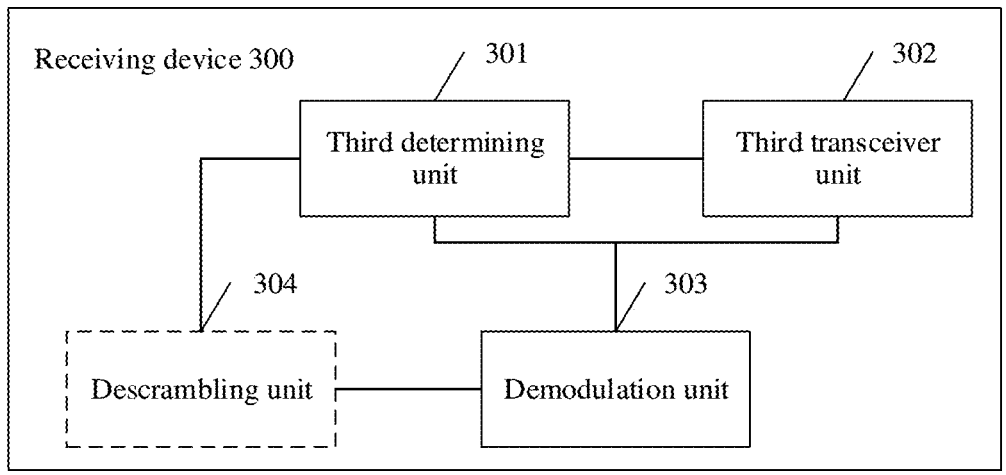
FIG. 11 is a schematic diagram of a structure of a receiving device according to an embodiment of this application.

FIG. 11 is a schematic diagram of a structure of a receiving device 300 according to an embodiment of this application. As shown in FIG. 11, the receiving device 300 may include: a third determining unit 301, configured to determine a first sequence, where the first sequence is used by a backscatter device to perform first scrambling on backscatter device data; a third transceiver unit 302, configured to receive a second signal from the backscatter device, where the second signal carries backscatter device data obtained after the first scrambling, the backscatter device data is scrambled by using the first sequence, and the first sequence is sent to the backscatter device by an excitation device; and a demodulation unit 303, configured to demodulate, based on the first sequence determined by the third determining unit 301, the second signal received by the third transceiver unit 302, to obtain the backscatter device data.

In some feasible implementations, the third determining unit 301 is further configured to determine a parameter of the first sequence, and the parameter of the first sequence is used to determine the first sequence.

In some feasible implementations, the third transceiver unit 302 is further configured to send first indication information to the excitation device, and the first indication information is used to indicate a parameter of the first sequence.

In some feasible implementations, the third transceiver unit 302 is further configured to receive second indication information from the excitation device, and the second indication information is used to indicate a parameter of a second sequence. The third determining unit 301 is further configured to determine the second sequence based on the parameter of the second sequence that is indicated by using the second indication information received by the third transceiver unit 302. The receiving device 300 further includes a descrambling unit 304, configured to descramble, based on the second sequence determined by the third determining unit 301, a second signal demodulated by the demodulation unit 303, to obtain the backscatter device data.

In some feasible implementations, the third transceiver unit 302 is further configured to send second indication information to the excitation device, and the second indication information is used to indicate a parameter of a second sequence.

In some feasible implementations, the third transceiver unit 302 is further configured to send third indication information to the excitation device, and the third indication information is used to indicate a parameter of a first signal.

The third determining unit 301, the demodulation unit 303, and/or the descrambling unit 304 may be one unit, for example, a processing unit.

During specific implementation, for an implementation of each unit, methods and functions performed by the receiving device in the foregoing embodiment may be performed with reference to the corresponding descriptions of the receiving device in the method embodiments shown in FIG. 3a and FIG. 3b, FIG. 7a and FIG. 7b, or FIG. 8a to FIG. 8c.

In this embodiment of this application, the first signal is randomized by adding the first sequence on the first signal, and the backscatter device data is randomized by directly performing the second scrambling on the backscatter device data by using the second sequence, to reduce persistent interference in a backscatter communication process, improve an anti-interference capability and network performance of a backscatter communication network, and improve demodulation performance of the receiving device.

Figure 12:
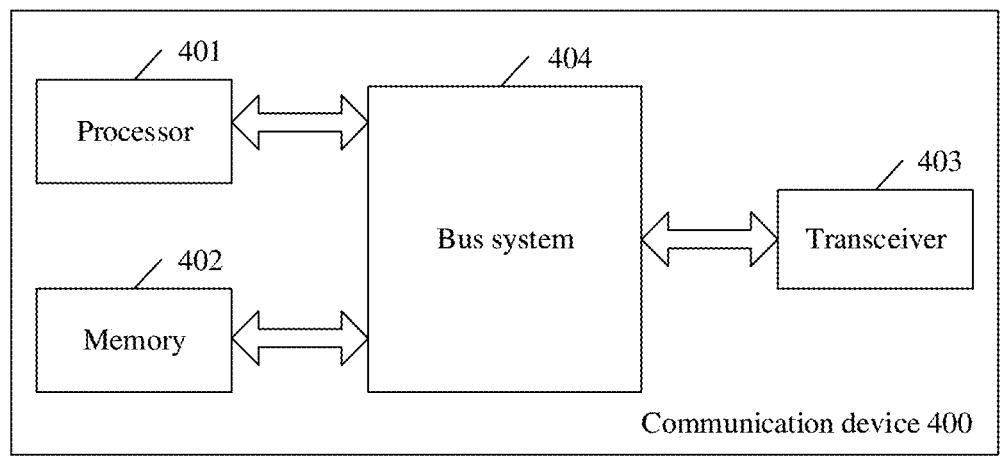
FIG. 12 is a schematic diagram of a structure of a communication device according to an embodiment of this application.

FIG. 12 is a schematic diagram of a structure of a communication device 400 according to an embodiment of this application. As shown in FIG. 12, the communication device 400 provided in this embodiment of this application includes a processor 401, a memory 402, a transceiver 403, and a bus system 404. The communication device provided in this embodiment of this application may be any one of an excitation device, a backscatter device, and a receiving device.

The processor 401, the memory 402, and the transceiver 403 are connected by using the bus system 404.

The memory 402 is configured to store a program. Specifically, the program may include program code, and the program code includes computer operation instructions. The memory 402 includes but is not limited to a random access memory (RAM), a read-only memory (ROM), an erasable programmable read-only memory (EPROM), or a compact disc read-only memory (CD-ROM). Only one memory is shown in FIG. 4a and FIG. 4b. Certainly, a plurality of memories may alternatively be set as required. The memory 402 may alternatively be a memory in the processor 401. This is not limited herein.

The memory 402 stores the following elements: an executable unit or a data structure, a subset thereof, or an extended set thereof: operation instructions that include various operation instructions and that are used to implement various operations; and an operating system that includes various system programs and that is used to implement various basic services and process a hardware-based task.

The processor 401 controls an operation of the communication device 400. The processor 401 may be one or more central processing units (CPUs). When the processor 401 is one CPU, the CPU may be a single-core CPU, or may be a multi-core CPU.

In specific application, components of the communication device 400 are coupled together by using the bus system 404. In addition to a data bus, the bus system 404 may further include a power bus, a control bus, a status signal bus, and the like. However, for clear description, various buses are marked as the bus system 404 in FIG. 12. For ease of illustration, FIG. 12 shows merely an example.

FIG. 3a and FIG. 3b, FIG. 7a and FIG. 7b, or FIG. 8a to FIG. 8c provided in the embodiments of this application, or the method of the excitation device disclosed in the foregoing embodiments; FIG. 3a and FIG. 3b, FIG. 7a and FIG. 7b, or FIG. 8a to FIG. 8c provided in the embodiments of this application, or the method of the backscatter device in the foregoing embodiments; or FIG. 3a and FIG. 3b, FIG. 7a and FIG. 7b, or FIG. 8a to FIG. 8c provided in the embodiments of this application, or the method of the receiving device in the foregoing embodiments may be applied to the processor 401, or implemented by the processor 401. The processor 401 may be an integrated circuit chip that has a signal processing capability. In an implementation process, steps of the foregoing methods may be completed by using a hardware integrated logic circuit in the processor 401, or by using instructions in a form of software. The processor 401 may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware and a software module in a decoding processor. A software module may be located in a mature storage medium in the art, such as a random access memory, a flash memory, a read-only memory, a programmable read-only memory, an electrically erasable programmable memory, or a register. The storage medium is located in the memory 402. The processor 401 reads information in the memory 402, and performs, in combination with hardware of the processor 401, the method steps of the excitation device described in FIG. 3a and FIG. 3b, FIG. 7a and FIG. 7b, or FIG. 8a to FIG. 8c, or the foregoing embodiments; performs, in combination with hardware of the processor 401, the method steps of the backscatter device described in FIG. 3a and FIG. 3b, FIG. 7a and FIG. 7b, or FIG. 8a to FIG. 8c, or the foregoing embodiments; or performs, in combination with hardware of the processor 401, the method steps of the receiving device described in FIG. 3a and FIG. 3b, FIG. 7a and FIG. 7b, or FIG. 8a to FIG. 8c, or the foregoing embodiments.

An embodiment of this application further provides a computer program product. The computer program product includes computer program code. When the computer program code is run on a computer, the computer is enabled to perform the method steps of the excitation device described in FIG. 3a and FIG. 3b, FIG. 7a and FIG. 7b, or FIG. 8a to FIG. 8c; when the computer program code is run on a computer, the computer is enabled to perform the method steps of the backscatter device described in FIG. 3a and FIG. 3b, FIG. 7a and FIG. 7b, or FIG. 8a to FIG. 8c; or when the computer program code is run on a computer, the computer is enabled to perform the method steps of the receiving device described in FIG. 3a and FIG. 3b, FIG. 7a and FIG. 7b, or FIG. 8a to FIG. 8c.

An embodiment of this application further provides a chip, including a processor. The processor is configured to read and execute a computer program stored in a memory, to perform the backscatter communication method in any possible implementation in FIG. 3a and FIG. 3b, FIG. 7, or FIG. 8a to FIG. 8c. Optionally, the chip further includes the memory, and the memory is connected to the processor through a circuit or a wire. Further, optionally, the chip further includes a communication interface. The processor is connected to the communication interface. The communication interface is configured to receive data and/or information that needs to be processed. The processor obtains the data and/or the information from the communication interface, processes the data and/or the information, and outputs a processing result by using the communication interface. The communication interface may be an input/output interface.

Optionally, the processor and the memory may be physically independent units, or the memory and the processor may be integrated together.

A person of ordinary skill in the art may understand that all or some of the procedures of the methods in the embodiments may be implemented by hardware related to computer program instructions. The computer program instructions may be stored in a computer-readable storage medium. When the computer program instructions are executed, the procedures in the method embodiments may be performed. The foregoing storage medium includes any medium that can store program code, such as a ROM, a random access memory (RAM), a magnetic disk, or an optical disk.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by an excitation device, a first sequence;
   generating, by the excitation device, a first signal;
   sending, by the excitation device, the first signal to a backscatter device; and
   sending, by the excitation device, the first signal to a receiving device, wherein the receiving device receives backscatter device data from the backscatter device in a second signal different and separate from the first signal, wherein the first signal carries the first sequence, and wherein the first sequence is used by the backscatter device to perform first scrambling on the backscatter device data, the backscatter device data produced by the backscatter device.

2. The method according to claim 1, further comprising:
   determining, by the excitation device, a parameter of the first sequence, and using the parameter of the first sequence to determine the first sequence.

3. The method according to claim 2, further comprising:
   sending, by the excitation device, first indication information to the receiving device that receives the backscatter device data from the backscatter device, wherein the first indication information indicates the parameter of the first sequence.

4. The method according to claim 3, wherein the parameter of the first sequence is determined based on at least one of:
   a physical layer identifier of backscatter communication, a physical layer identifier of the excitation device, a physical layer identifier of the receiving device, time domain information of the first signal, or a frequency of the first signal.

5. The method according to claim 2, wherein the parameter of the first sequence comprises at least one of: a sequence type of the first sequence, an initial value of the first sequence, or a sequence shift value of the first sequence.

6. The method according to claim 1, further comprising:
   determining, by the excitation device, a parameter of the first signal.

7. The method according to claim 6, wherein the parameter of the first signal comprises at least one of:
   a subcarrier location of the first signal, a subcarrier spacing of the first signal, a time length of the first signal, a frequency hopping pattern of the first signal, or a transmit power of the first signal.

8. The method according to claim 1, further comprising:
   sending, by the excitation device, second indication information to the backscatter device and the receiving device, wherein the second indication information indicates a second parameter of a second sequence, and the second sequence is used for performing second scrambling on the backscatter device data.

9. The method according to claim 1, further comprising:
   receiving, by the excitation device, second indication information from the receiving device, and sending the second indication information to the backscatter device, wherein the second indication information indicates a second parameter of a second sequence, and the second sequence is used to perform second scrambling on the backscatter device data.

10. The method according to claim 9, wherein the second parameter of the second sequence comprises at least one of:
    a sequence type of the second sequence, an initial value of the second sequence, or a sequence shift value of the second sequence.

11. The method of claim 1,
    wherein the first signal is used by the backscatter device to modulate the backscatter device data to obtain the second signal, and wherein the second signal is demodulated by the receiving device based on the first sequence to obtain the backscatter device data, and
    wherein the first signal is received by the receiving device in a first path, wherein the second signal is received by the receiving device in a second path different from the first path, wherein the first path excludes the backscatter device, and wherein the first signal excludes the backscatter device data.

12. A method, comprising:
    receiving, by a backscatter device, a first signal from an excitation device, wherein the first signal is further received by a receiving device, the first signal carries a first sequence, and the first sequence is used to perform first scrambling on backscatter device data, the backscatter device data produced by the backscatter device;
    modulating, by the backscatter device, the backscatter device data to the first signal to obtain a second signal, wherein the second signal carries the backscatter device data obtained after the first scrambling, the modulating comprising:
       performing, by the backscatter device, the first scrambling on the backscatter device data using the first sequence; and
    backscattering, by the backscatter device, the second signal to the receiving device, the second signal being different and separate from the first signal.

13. The method according to claim 12, further comprising:
    determining, by the backscatter device, a second sequence;
    performing, by the backscatter device, second scrambling on the backscatter device data using the second sequence; and
    wherein the modulating, by the backscatter device, the backscatter device data onto the first signal to obtain the second signal comprises:
       modulating, by the backscatter device, the backscatter device data obtained after the second scrambling to the first signal to obtain the second signal.

14. The method according to claim 13, further comprising:
    receiving, by the backscatter device, second indication information from the excitation device or the receiving device, wherein the second indication information indicates a second parameter of the second sequence.

15. The method according to claim 14, wherein the second parameter of the second sequence comprises at least one of:
    a sequence type of the second sequence, an initial value of the second sequence, or a sequence shift value of the second sequence.

16. A method, comprising:
    receiving, by a receiving device, a first signal carrying a first sequence, wherein the first signal is further received by a backscatter device, and the first sequence is used by the backscatter device to perform first scrambling on backscatter device data, the backscatter device data produced by the backscatter device;
    receiving, by the receiving device, a second signal from the backscatter device, wherein the second signal carries the backscatter device data obtained after the first scrambling, and wherein the second signal is different and separate from the first signal; and demodulating, by the receiving device, the second signal based on the first sequence, to obtain the backscatter device data.

17. The method according to claim 16, further comprising:

determining, by the receiving device, a parameter of the first sequence, wherein the parameter of the first sequence is used to determine the first sequence.

18. The method according to claim 17, further comprising:

sending, by the receiving device, first indication information to an excitation device, wherein the first indication information indicates the parameter of the first sequence.

19. The method according to claim 18, further comprising:

receiving, by the receiving device, second indication information from the excitation device, wherein the second indication information indicates a second parameter of a second sequence;

determining, by the receiving device, the second sequence based on the second parameter of the second sequence; and descrambling, by the receiving device, a demodulated second signal based on the second sequence, to obtain the backscatter device data.

20. The method according to claim 16, further comprising:

sending, by the receiving device, second indication information to an excitation device, wherein the second indication information indicates a second parameter of a second sequence.

21. The method according to claim 16, further comprising:

sending, by the receiving device, third indication information to an excitation device, wherein the third indication information indicates a parameter of the first signal.

* * * * *